(12) United States Patent
N et al.

(10) Patent No.: US 10,467,501 B2
(45) Date of Patent: Nov. 5, 2019

(54) COMPUTER VISION ARCHITECTURE WITH MACHINE LEARNED IMAGE RECOGNITION MODELS

(71) Applicant: SAP SE, Walldorf (DE)

(72) Inventors: Sivakumar N, Tamil nadu (IN); Praveenkumar A K, Bangalore (IN); Raghavendra D, Bangalore (IN); Vijay G, Bangalore (IN); Pratik Shenoy, Bangalore (IN); Kishan Kumar Kedia, Birpara (IN)

(73) Assignee: SAP SE, Walldorf (DE)

( * ) Notice: Subject to any disclaimer, the term of this patent is extended or adjusted under 35 U.S.C. 154(b) by 109 days.

(21) Appl. No.: 15/797,117

(22) Filed: Oct. 30, 2017

(65) Prior Publication Data

US 2019/0130214 A1    May 2, 2019

(51) Int. Cl.
 *G06K 9/62* (2006.01)
 *G06N 3/04* (2006.01)
 (Continued)

(52) U.S. Cl.
 CPC ....... *G06K 9/6256* (2013.01); *G06K 9/00208* (2013.01); *G06K 9/00771* (2013.01); *G06K 9/00973* (2013.01); *G06K 9/3241* (2013.01); *G06K 9/34* (2013.01); *G06K 9/4628* (2013.01); *G06K 9/6204* (2013.01); *G06K 9/6218* (2013.01); *G06K 9/6268* (2013.01); *G06K 9/6273* (2013.01); *G06K 9/6284* (2013.01);
 (Continued)

(58) Field of Classification Search
 CPC ............. G06K 9/6256; G06K 9/00973; G06K 9/6218; G06K 9/6268; G06N 20/00; G06N 3/04; G06T 7/60; G06T 7/75; G06T 2200/28; G06T 2207/30242

USPC ......................................................... 382/158
 See application file for complete search history.

(56) References Cited

U.S. PATENT DOCUMENTS

| 9,569,700 | B1 | 2/2017 | Santos et al. |
| 2017/0169315 | A1* | 6/2017 | Vaca Castano ...... G06K 9/3233 |
| 2017/0206431 | A1* | 7/2017 | Sun ........................ G06N 3/084 |

OTHER PUBLICATIONS

"European Application Serial No. 18203331.6, Extended European Search Report dated Mar. 19, 2019", 12 pgs.
(Continued)

*Primary Examiner* — Andrew M Moyer
(74) *Attorney, Agent, or Firm* — Schwegman Lundberg & Woessner, P.A.

(57) ABSTRACT

In an example, a first machine learning algorithm is used to train a smart contour model to identify contours of product shapes in input images and to identify backgrounds in the input images. A second machine learning algorithm is used to train a plurality of shape-specific classification models to output identifications of products in input images. A candidate image of one or more products is obtained. The candidate image is passed to the smart contour model, obtaining output of one or more tags identifying product contours in the candidate image. The candidate image and the one or more tags are passed to an ultra-large scale multi-hierarchy classification system to identify one or more classification models for one or more individual product shapes in the candidate image. The one or more classification models are used to distinguish between one or more products and one or more unknown products in the image.

20 Claims, 20 Drawing Sheets

(51) Int. Cl.
*G06N 3/08* (2006.01)
*G06K 9/00* (2006.01)
*G06K 9/32* (2006.01)
*G06K 9/34* (2006.01)
*G06K 9/46* (2006.01)
*G06T 7/73* (2017.01)
*G06N 20/00* (2019.01)
*G06T 7/60* (2017.01)
*G06N 3/02* (2006.01)
*G06N 5/04* (2006.01)
*G06Q 10/08* (2012.01)

(52) U.S. Cl.
CPC ............... *G06N 3/02* (2013.01); *G06N 3/04* (2013.01); *G06N 3/0454* (2013.01); *G06N 3/084* (2013.01); *G06N 5/047* (2013.01); *G06N 20/00* (2019.01); *G06T 7/60* (2013.01); *G06T 7/75* (2017.01); *G06Q 10/087* (2013.01); *G06T 2200/28* (2013.01); *G06T 2207/30242* (2013.01)

(56) References Cited

OTHER PUBLICATIONS

Girshick, Ross, et al., "Rich Feature Hierarchies for Accurate Object Detection and Semantic Segmentation Tech Report (v5)", UC Berkeley, [Online]. Retrieved from the Internet: <URL: URL:https://arxiv.org/pdf/1311.2524v5.pdf>, (2014), 1-21.

Ren, Shaoqing, et al., "Faster R-CNN: Towards Real-Time Object Detection with Region Proposal Networks", IEEE Transactions on Pattern Analysis and Machine Intelligence, 39(6)., (2017), 1137-1149.

Verma, Nishchal, et al., "Object Identification for Inventory Management using Convolutional Nerual Network", IEEE Applied Imagery Pattern Recognition Workshop, (2016), 6 pgs.

U.S. Appl. No. 15/812,533, filed Nov. 14, 2017, Dynamic Self-Learning System.

* cited by examiner

ORIGINAL

HORIZONTAL FLIP

COUNTERCLOCKWISE ROTATION

CLOCKWISE ROTATION

BRIGHT

DULL

COMPUTER VISION ARCHITECTURE WITH MACHINE LEARNED IMAGE RECOGNITION MODELS

TECHNICAL FIELD

This document generally relates to systems and methods for computer platform environments. More specifically, this document relates to a computer vision architecture with machine learned image recognition models.

BACKGROUND

Maintaining proper counts of inventories of goods, such as retail goods or raw materials, is important to many different businesses. For example, a retail store, such as a supermarket, must take pains to ensure that shelves are fully stocked, and yet consumer interaction with the products on the shelves can make this difficult. Customers may, for example, place items in the wrong location or oriented the wrong way for effective sales. Typically inventory status is determined by a human, for example, walking through the aisles and counting stock. Recent efforts to automate this process have included tagging (e.g., using Radio Frequency identification (RFID)) of products, scale sensors in shelves, and so forth. All of these automations, however, still suffer from some of the basic problems that occur in real-world use of products. A scale, for example, does not aid in detecting inventory levels if an item is placed on the wrong shelf, and it does not help with proper orientation if the item is improperly oriented.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, an array of image capture devices, such as cameras, are installed on structures in which they have a good view of items relevant to inventory. This can include structures such as shelves, coolers, cupboards, racks, ceilings, and so forth. Images captured from these image capture devices can then be sent to a computer vision intelligence component including a number of machine-learned models to identify products in the images and relevant information (e.g., inventory count, orientation, etc.). This may include, for example, identifying contours of the products and then classifying the portions of the images inside these contours as appropriate products. This may also include depth perception and product location clustering. Post-processing from outputs of these models may then be used to provide services related to the products, such as identifying and counting stock, adherence checks for physical placement of the products, competitor product detection, and so forth.

Figure 1:
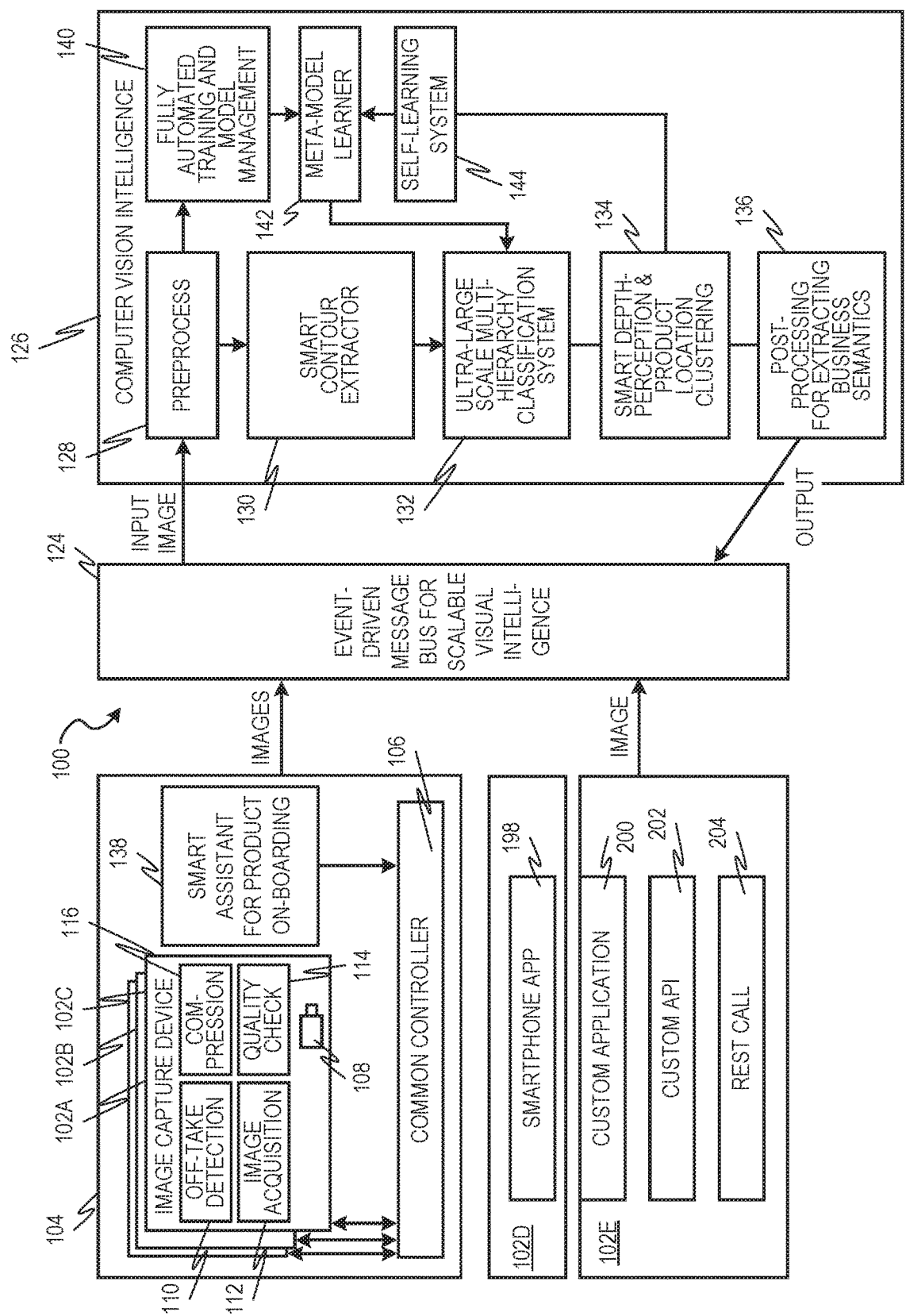
FIG. 1 is a block diagram illustrating a system, in accordance with an example embodiment, for image capture and interpretation.

FIG. 1 is a block diagram illustrating a system 100, in accordance with an example embodiment, for image capture and interpretation. Various types of image capture devices 102A-102E are depicted in this figure. In practice, the system 100 may include any combination of any number of these image capture devices 102A-102G. Examples of image capture devices include smart edge clients 102A-102C, which are depicted as part of an array 104 that also includes a common controller 106. The smart edge clients 102A-102C may be affixed to a structure, such as a wall, ceiling, rack, cooler, shelf, or the like and each contains a camera 108. In some example embodiment, multiple smart edge clients 102A-102C are located separately but have their cameras 108 all aimed at the same location, such as a particular portion of a shelf, providing different angles of the same physical products. As will be described in more detail later, these multiple angles can aid in the depth perception modeling. Of course, there could be any number of these smart edge clients 102A-102C in an array 104, and any number of arrays 104 in a location, such as a building.

Each smart edge client 102A-102C may also include an off-take detection component 110. The off-take detection component 110 acts to limit image capture to specific times or events in order to save on processing power, bandwidth, and electrical power. For example, the off-take detection component 110 may include a motion sensor such that image capture only occurs when motion is detected. An image acquisition component 112 interfaces with the fixed cameras 108 to actually obtain the images from the fixed cameras. A quality check component 114 can check various quality control parameters of the images and discard images that have poor quality, such as from low lighting, blurriness, obstructions, and the like. A compression component 116 may then act to compress the images for transmission.

Another image capture device 102D can be a smartphone or other mobile device that has an integrated camera. The smartphone or other mobile device 102D can then also have a smartphone application ("app") 118 for capturing the images from the integrated camera. This smartphone app 118 can then also perform the functions described above with respect to the off-take detection component 110, quality check component 114, and compression component 116. Of course, since the smartphone or other mobile device 102D is not fixed, it can then be used in a different manner than smart edge clients 102A-102C. For example, a stock person could carry the smartphone or other mobile device 102D around a warehouse capturing images of all the shelves as he or she walked. In this way, multiple angles can be captured of the same locations without the need for multiple fixed cameras. Additionally, in some example embodiments, the images captured from a smartphone or other mobile device 102D can be used to supplement images captured by smart edge clients 102A-102C.

Additional image capture devices 102E are also depicted. The hardware of these additional image capture devices 102E is not important for purposes of this document, but these additional image capture devices 102E include additional software components that can be used to transfer images, including, for example, a custom application 120, a custom Application Program Interface (API) 122, and a custom Representational State Transfer (REST) Call component 124.

All images are sent to an event-driven message bus 124, which may act to temporarily store the images until they can be processed. This may include placing the images in a queue. Images can be processed from the queue in batch processes using, for example, a publisher-subscriber model, to a computer vision intelligence pipeline 126. Output data from the computer vision intelligence pipeline 126 can then be published back to the event-driven message bus 124. One or more consumer applications (not pictured) can then subscribe to the service(s) on the event-driven message bus 124 to see published results.

The computer vision intelligence pipeline 126 acts to process the images and extract useful relevant data from the input images. The computer vision intelligence pipeline 126 includes a preprocessing component 128. The images captured by, for example, smart edge clients 102A-102C may not be of ideal quality for applying the vision intelligence, and hence the image input can be enhanced using various techniques.

Figure 2:
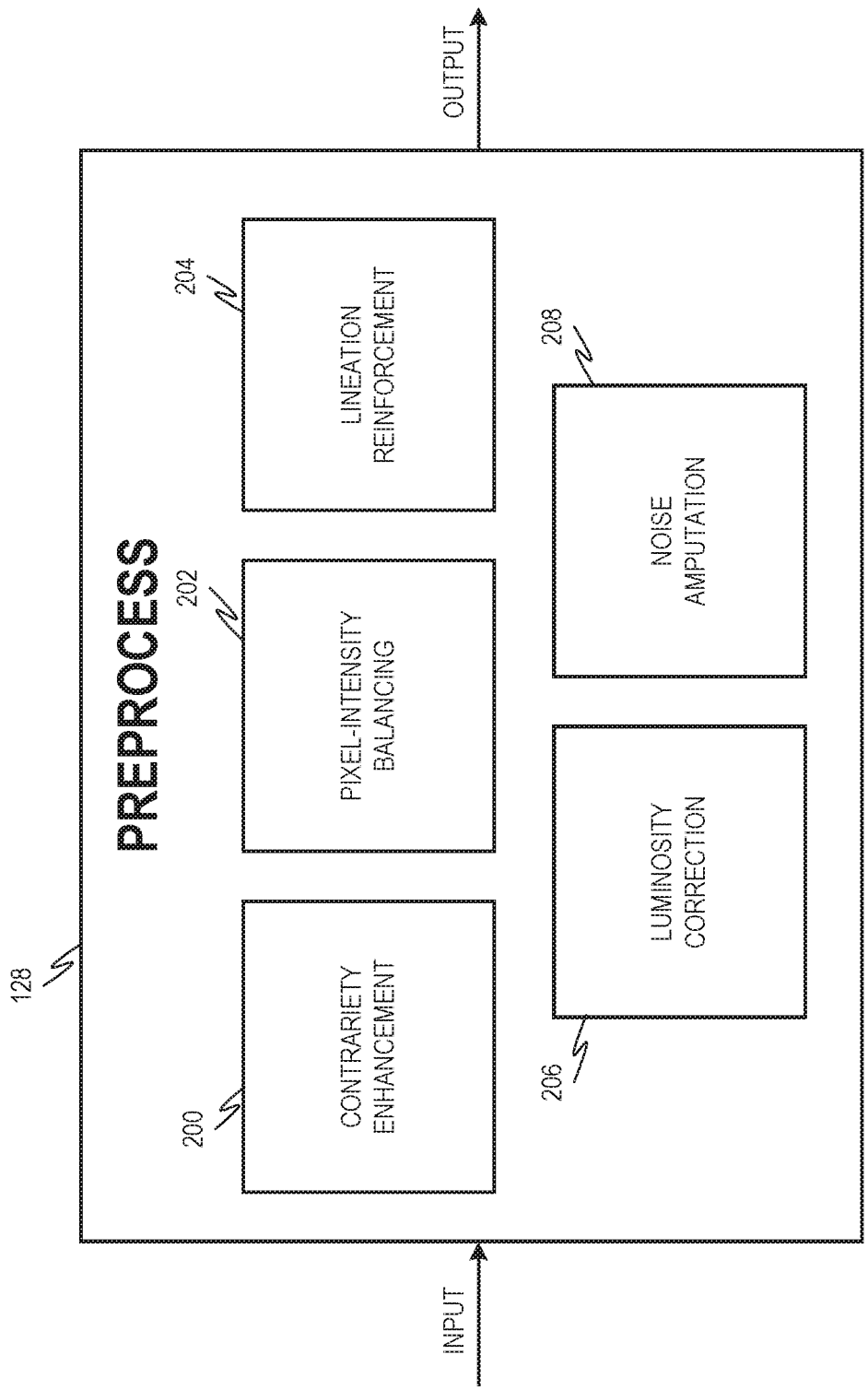
FIG. 2 is a block diagram illustrating a preprocessing component, in accordance with an example embodiment, in more detail.

FIG. 2 is a block diagram illustrating the preprocessing component 128, in accordance with an example embodiment, in more detail. Sometimes, the main content in an image may be obscured due to haze, dust, glare, and the like. A contrariety enhancement sub-component 200 acts to enhance the image to ensure that the main content stands out, making it easier to mark product borders. Additionally, sometimes the images may have a narrow range of information; for example, instead of 0-255 available values for each channel, it may only have information within a 0-50 pixel intensity. A pixel-intensity balancing sub-component 202 acts to ensure that there is a correct balance of pixel intensity data. A lineation reinforcement sub-component 204 acts to make the edges of a product more prominent in an image. One example technique that can be used by the lineation reinforcement sub-component 204 is bilateral filtering.

A luminosity correction sub-component 206 acts to give resilience to the model(s) for different lighting conditions when the images were taken. For example, a model may have been trained using images taken in white fluorescent light, but then that model may have poor accuracy when used on images taken in tungsten lighting conditions. The luminosity correction sub-component 206 is able to simulate different lighting conditions so that the model can be effective in non-trained lighting conditions.

A noise amputation sub-component 208 acts to remove the unwanted noise from images, such as grainy noise, mist, or haze. This can be achieved through, for example, pixel averaging, blurring, applying various filters, and the like.

Referring back to FIG. 1, the computer vision intelligence pipeline 126 further includes a smart contour extractor 130. The smart contour extractor 130 acts to excavate the regions of interest in an image, even with heterogeneous and background conditions on the image.

Figure 3:
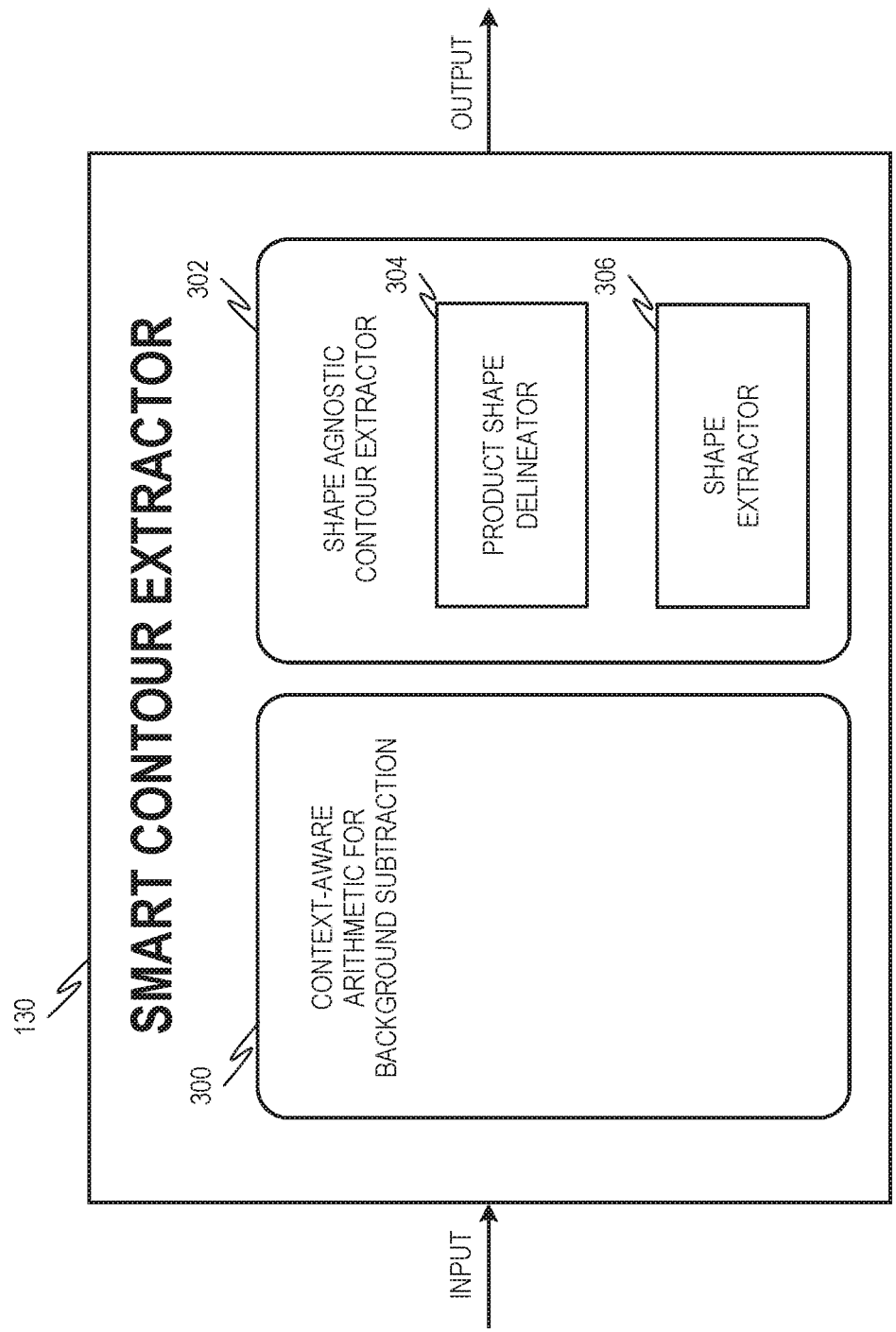
FIG. 3 is a block diagram illustrating a smart contour extractor, in accordance with an example embodiment, in more detail.

FIG. 3 is a block diagram illustrating the smart contour extractor 130, in accordance with an example embodiment, in more detail. Specifically, the smart contour extractor 130 may include a context-aware arithmetic for background subtraction component 300 and a shape-agnostic contour extractor component 302. The context-aware arithmetic for background subtraction component 300 distinguishes between relevant areas and background noise for better focus and computational efficiency. At the same time, it ensures that accuracy and performance re not affected by different types of backgrounds. As will be described in more detail below, a Convolutional Neural Network (CNN) is used to separate relevant areas from unwanted noise. The shape-agnostic contour extractor component 302 delineates shapes using a product shape delineator 304. Irrespective of the product type and its shape, an entire instance of any product can be fitted into a closed shape. Thus, even if the image itself is ambiguous as to the borders of the shape (due to, for example, lighting conditions causing an edge of the product in an image to bleed into the background), the product shape delineator 304 is able to infer the borders. If there are multiple instances of any item in the picture, then care is taken to fit each of them into their respective closed shapes, which ensures isolation of individual regions of interest within the image.

A shape extractor 306 acts to extract shapes even when they are occluded or not in full visibility of the camera frame. Items kept in a straight line (such as lined up on a shelf) may not appear so in an image. Hence, artificial recalibration of the product placement may be performed to enable clubbing of items kept in straight lines or grids.

Figure 4:
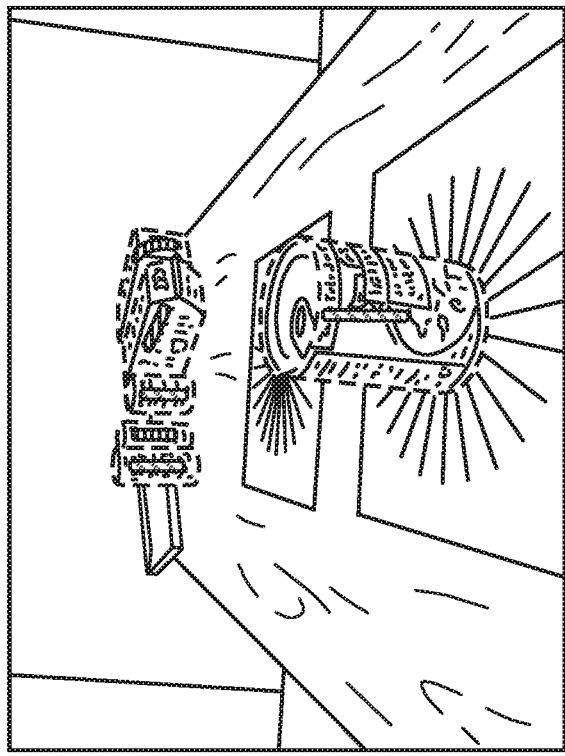
FIG. 4 is a diagram illustrating an example of a plurality of training images, in accordance with an example embodiment.
Figure 4:
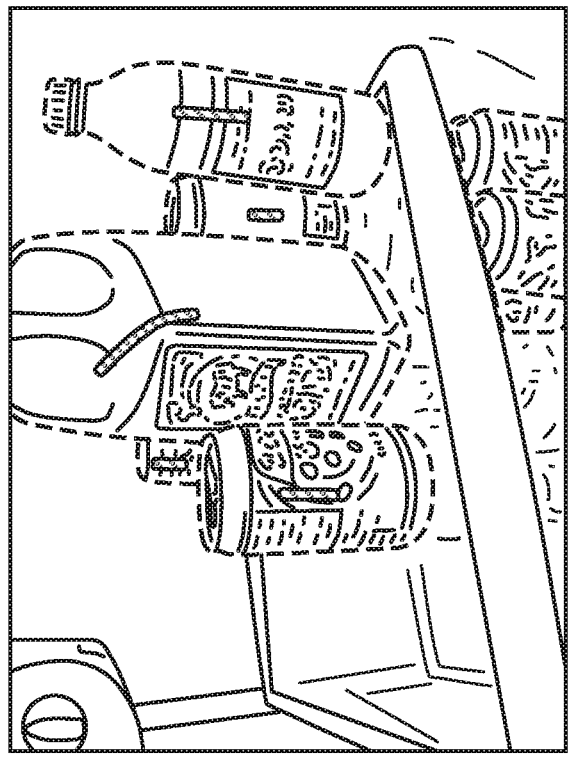
Figure 4:
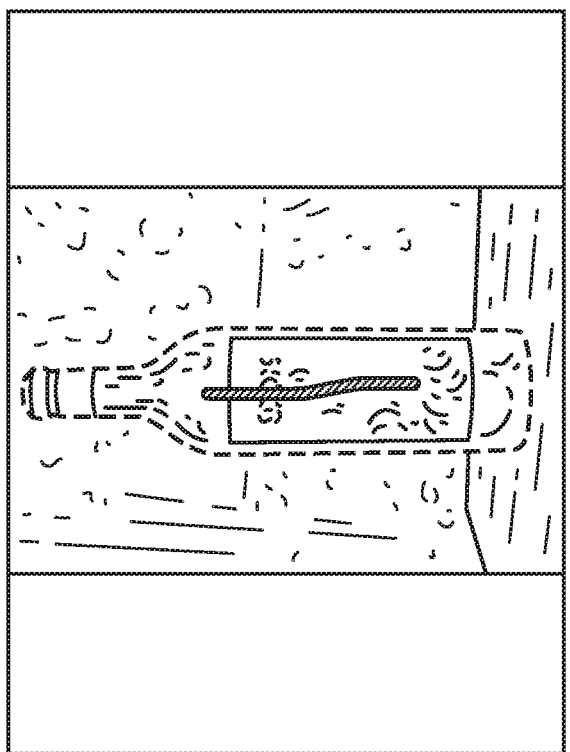

While the various components depicted in FIG. 3 are shown as separate components, in an example embodiment, the entire smart contour extractor 130 may be implemented as a single CNN that is trained to perform each of the tasks described with respect to the various components in FIG. 3. Specifically, in an example embodiment, a plurality of training images are obtained. These training images may be selected to reflect various product shapes and sizes against various different backgrounds. These training images may be labeled in such a way as to identify the contours of the various product shapes in each image as well as to identify the background. While in some example embodiments these labels may be placed in the training images themselves, in another example embodiments, separate label files may graphically identify the contours of the various product shapes in each image as well as identify the background. FIG. 4 is a diagram illustrating an example of a plurality of training images 400A-400C, in accordance with an example embodiment. Ground truth images for the neural network model's training may be created and resized to a fixed resolution (e.g., 640×480, they may be padded accordingly to maintain aspect ratio). As can be seen here, the outer contours of all the objects are then marked in the image. While it cannot be seen in the figure, in an example embodiment, the images are converted to grayscale prior to the contours being placed, thereby allowing the contours to be placed in color and be easily distinguishable. The corresponding ground truths (i.e., the contours) may be stored in files, such as Javascript Object Notation (JSON) files.

Figure 5:
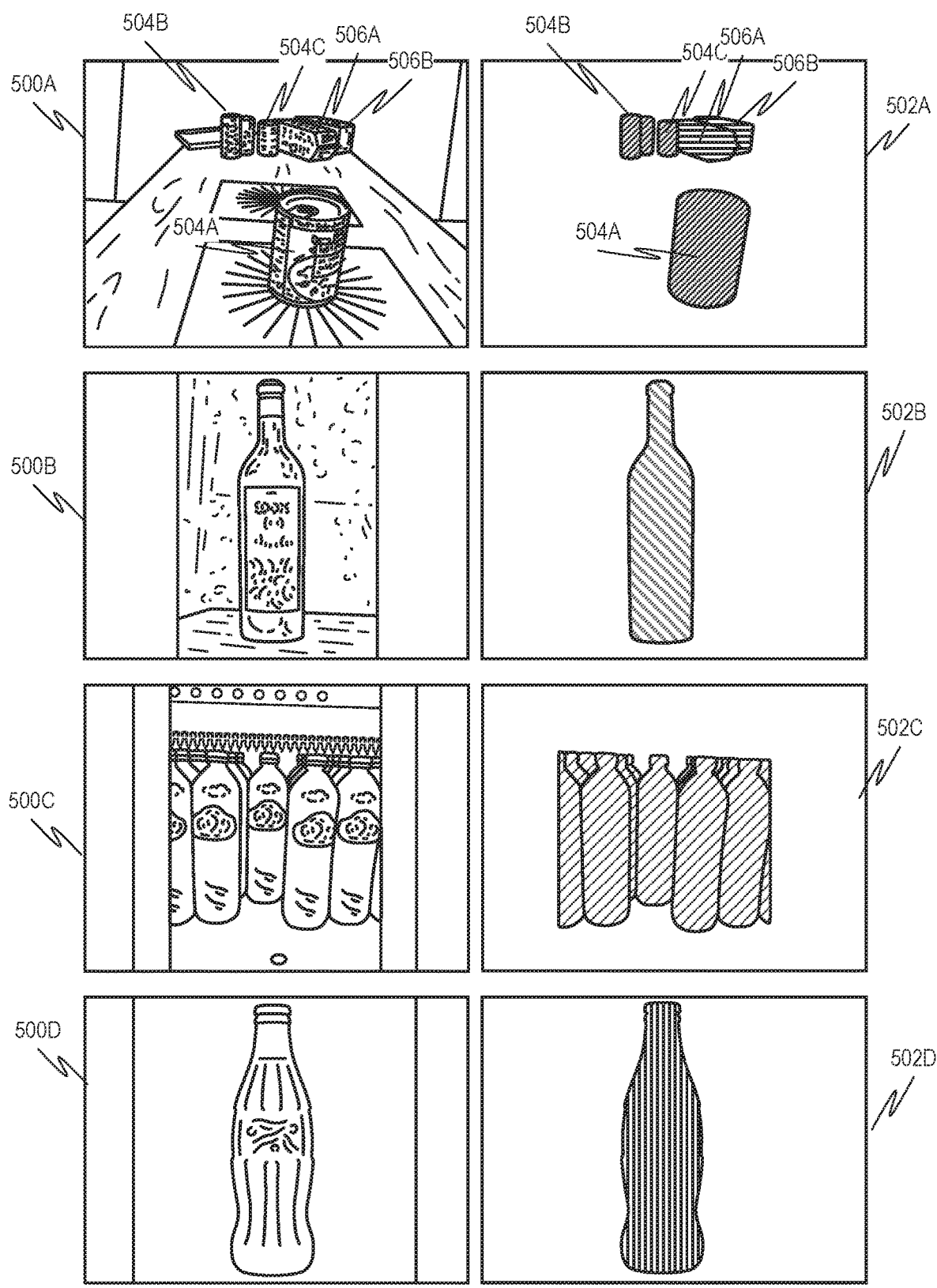
FIG. 5 is a diagram illustrating example images for semantic segmentation, in accordance with an example embodiment.

Depending on the type of the neural network and its corresponding data loaders, the ground truth images may then be recreated for semantic segmentation or edge detection. This may be done using the ground truth files and corresponding original images. The images for semantic segmentation may be kept in RGB or in one hot encoded value based on the data loader. FIG. 5 is a diagram illustrating example images for semantic segmentation, in accordance with an example embodiment. On the left side are original images 500A-500D, while on the right side are the classified semantic segmentation versions 502A-502D. Color in the classified semantic segmentation versions 502A-502D may represent a different classification of object (for example, the cans 504A, 504B, 504C in original image 500A and classified semantic segmentation version 502A may be represented in one color and the butter palettes 506A, 506B in another color.

Figure 6:
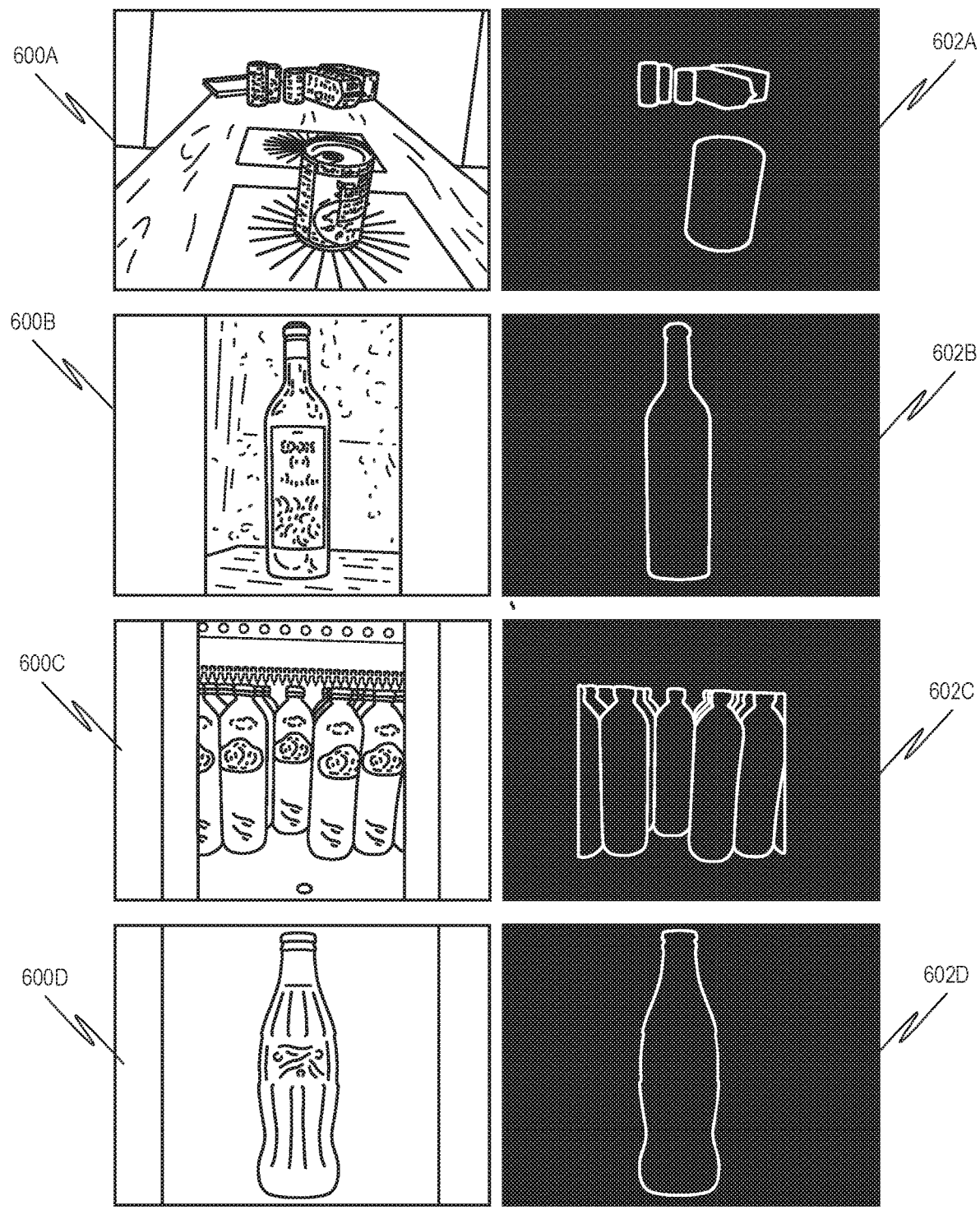
FIG. 6 is a diagram illustrating example images for edge detection, in accordance with an example embodiment.

FIG. 6 is a diagram illustrating example images for edge detection, in accordance with an example embodiment. On the left side are original images 600A-600D, while on the right side are the edge detected versions 602A-602D.

The ground truth images can be augmented with the steps such as gamma correction, 2D/3D rotation, and horizontal/vertical flip.

For example, for 2D rotation, a normal matrix rotation may be used:

$$M = \begin{bmatrix} \cos\theta & -\sin\theta \\ \sin\theta & \cos\theta \end{bmatrix}$$

or scaled matrix rotation may be used:

$$\begin{bmatrix} \alpha & \beta & (1-\alpha)\cdot\text{center}\cdot x - \beta\cdot\text{center}\cdot y \\ -\beta & \alpha & \beta\cdot\text{center}\cdot x + (1-\alpha)\cdot\text{center}\cdot y \end{bmatrix}$$

where, $\alpha = \text{scale}\cdot\cos\theta$, $\beta = \text{scale}\cdot\sin\theta$ For 3D rotation, functions that convert Euler Angles to Rotation Matrixes may be used:

$$R_x = \begin{bmatrix} 1 & 0 & 0 \\ 0 & \cos(\theta_x) & -\sin(\theta_x) \\ 0 & \sin(\theta_x) & (\cos\theta_x) \end{bmatrix}$$

$$R_y = \begin{bmatrix} \cos(\theta_y) & 0 & \sin(\theta_y) \\ 0 & 1 & 0 \\ -\sin(\theta_y) & 0 & (\cos\theta_y) \end{bmatrix}$$

$$R_z = \begin{bmatrix} \cos(\theta_z) & -\sin(\theta_z) & 0 \\ \sin(\theta_z) & (\cos\theta_z) & 0 \\ 0 & 0 & 1 \end{bmatrix}$$

Figure 7:
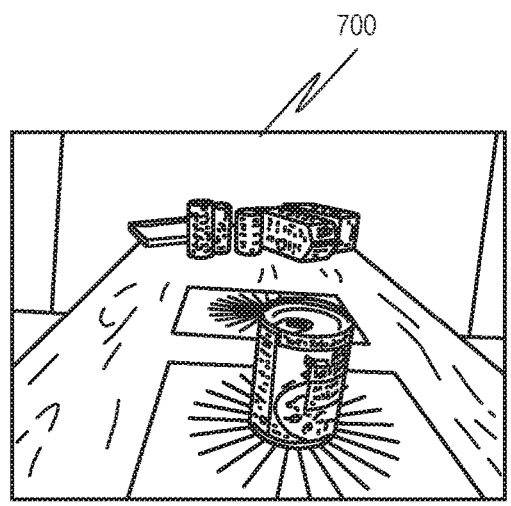
FIG. 7 is a diagram illustrating various example images for augmentation.
Figure 7:
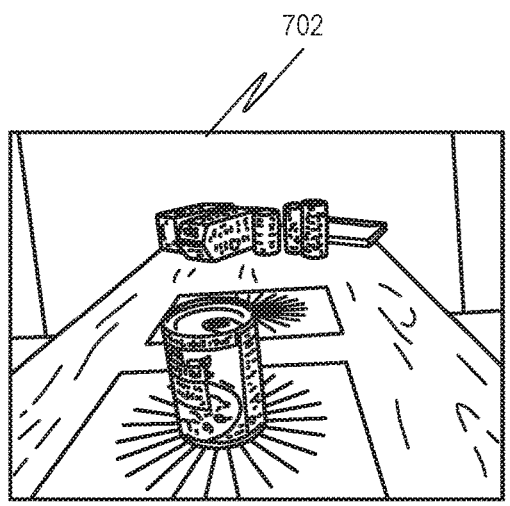
Figure 7:
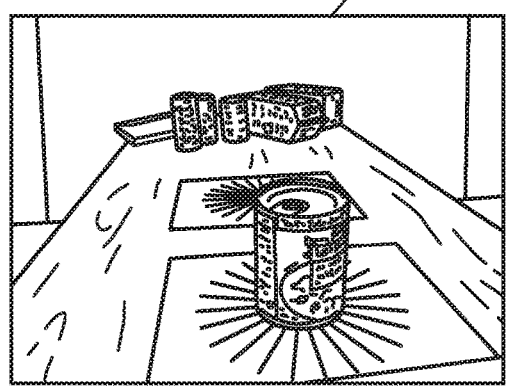
Figure 7:
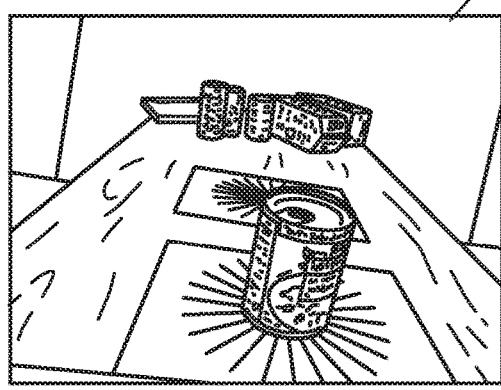
Figure 7:
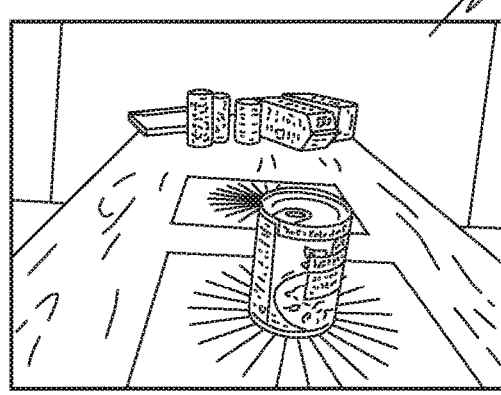
Figure 7:
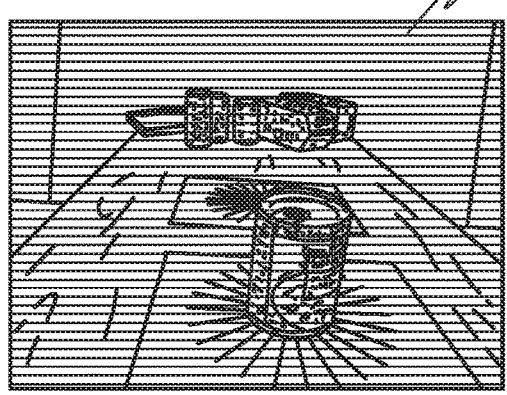

FIG. 7 is a diagram illustrating various example images for augmentation. For example, original image 700 may be horizontally flipped 702, rotated counterclockwise 704, rotated clockwise 706, brightened 708, or dulled 710.

Figure 8:
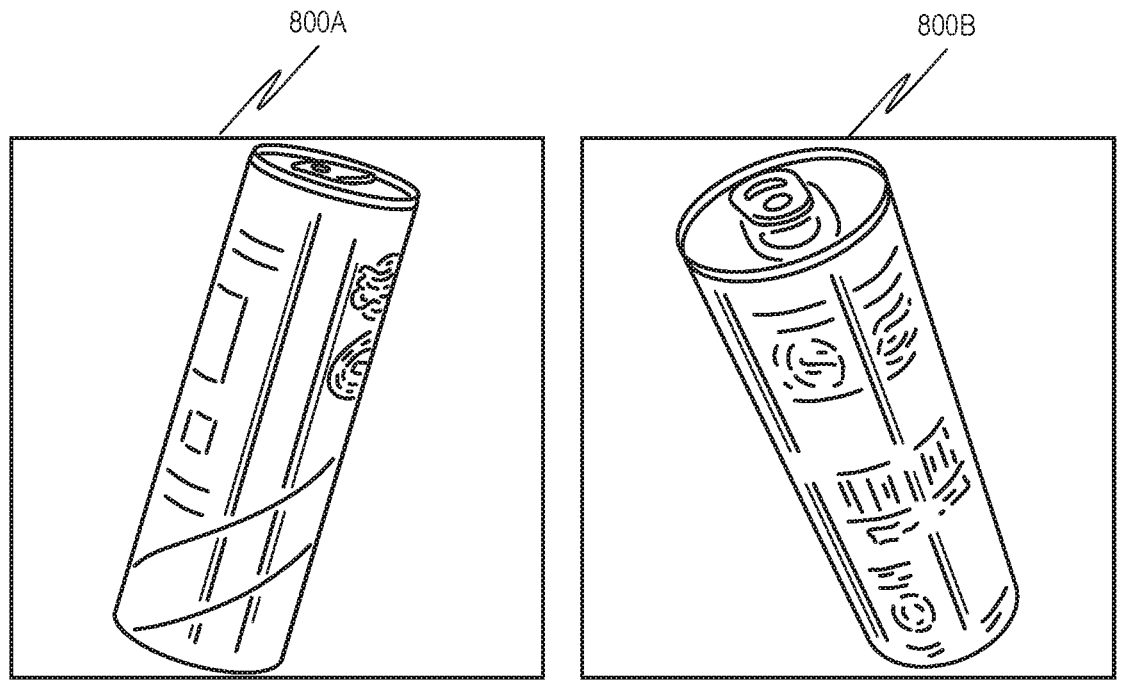
FIG. 8 is a diagram illustrating example extracted product images.

The models are then trained, using the above datasets, to learn about product location, shape, and edges. The results may be combined and the products extracted. FIG. 8 is a diagram illustrating example extracted product images. Here, the extracted product images 800A, 800B have been padded with black pixels to fit in a square to match a classification model.

Figure 9:
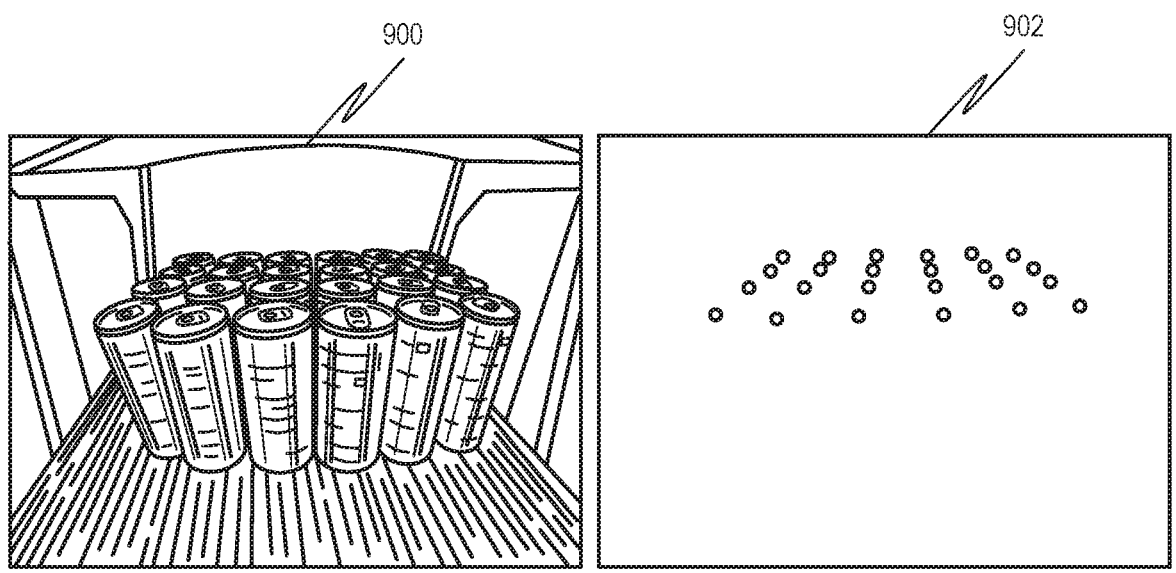
FIG. 9 is a diagram illustrating how a computer will initially view an image, in accordance with an example embodiment.
Figure 10:
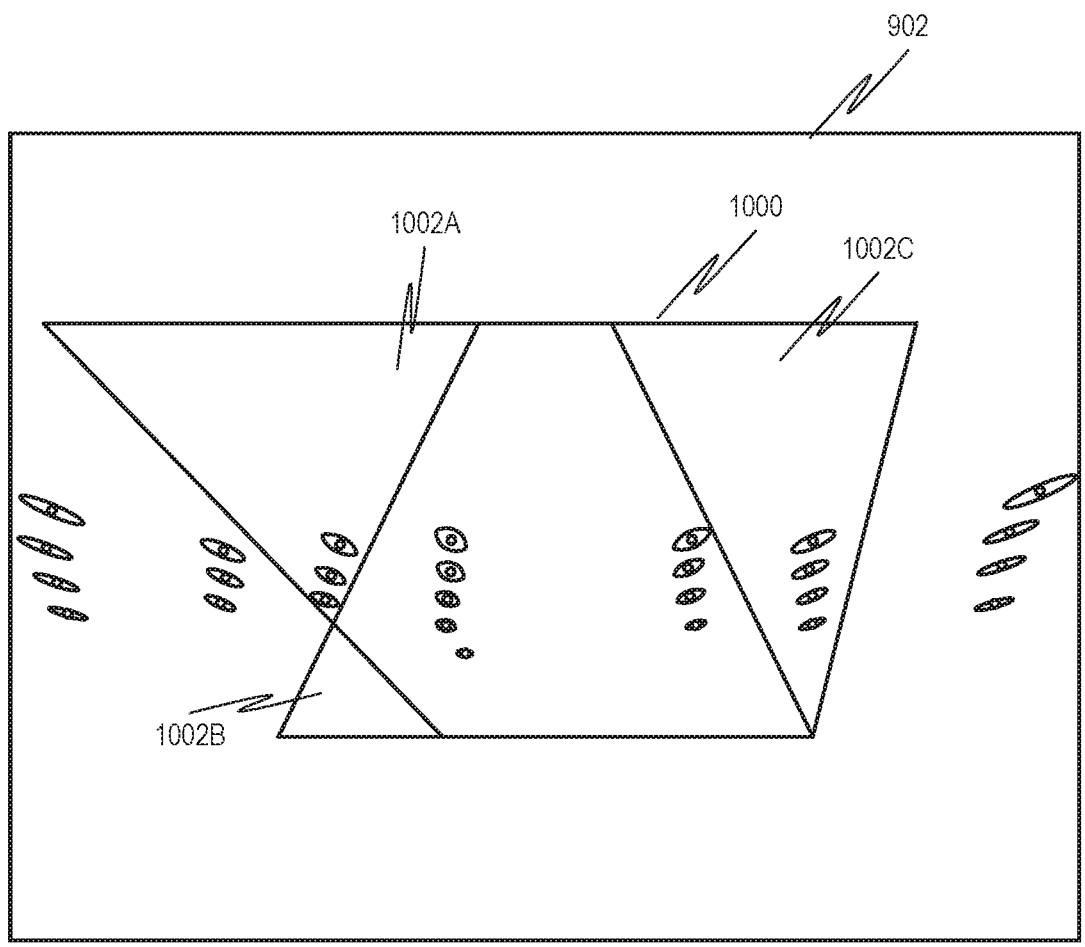
FIG. 10 is a diagram illustrating an image after calibration.

Camera calibration and image correction can then be performed. FIGS. 9 and 10 illustrate this process. Specifically, FIG. 9 is a diagram illustrating how a computer will initially view an image, in accordance with an example embodiment. Here, image 900 is taken from a camera looking into a cooler. Image 902 shows the contours of the cans in image 900 as points. Notice that the columns of these points do not appear straight, even though the cans in the cooler itself are straight.

In order to verify that the cans in the cooler are straight, the camera can be calibrated to capture skewness of the scene in front of the camera. This may involve capturing known data and using it to calibrate, such as keeping cans on four corners of the rack of the cooler to give points along the borders of the rack for calibration. FIG. 10 is a diagram illustrating image 902 after calibration. Specifically, trapezoid 1000 corresponds to the camera. The top and bottom of this trapezoid 1000 can be stretched and/or contracted so that the triangles 1002A, 1002B, 1002C are formed, which effectively corrects the slanted column points into straight orthogonal lines.

The calibration may be captured in a matrix that uses points from the trapezoid 1000 and triangles 1002A-1002C to derive the matrix.

The plurality of training images and labels (e.g., the JSON files) are fed to the CNN to train the CNN to output labels for one or more product shapes and a background for each input image. Therefore, at runtime, the CNN may be fed a candidate image and output an indication of where the contours of each product shape within the candidate image lie, as well as where the background lies. The format of this output may be, in some example embodiments, identical to the format of the labels used for training.

Referring back to FIG. 1, the computer vision intelligence pipeline 126 further includes an ultra-large scale multi-hierarchy classification system 132. The ultra-large scale multi-hierarchy classification system 132 acts to classify a large number (e.g., millions) of products, even when some of them look almost identical in terms of shape and/or color. Traditional approaches to such classification suffer from confidence dilations, which makes them unsuitable to large-scale use. In an example embodiment, a divide and conquer strategy is used to build a large number of smaller classification models (model lake) and use them via a smart model invoked in a complex hierarchical setup. This model approach first analyzes the extracted shape to decide the product category that the item falls into (e.g., bottles, cans, packets, tetra pack cuboids, etc.). This data is then used to interact with the correct models in parallel to identify products at a Stock Keeping Unit (SKU) level. This technique ensures that the model does not suffer from accuracy and scalability issues for, as an example, retail outlets with millions of products. If required, the hierarchy may also have an increased depth in order to handle more abstraction at each level until it gets to the SKU identification.

Figure 11:
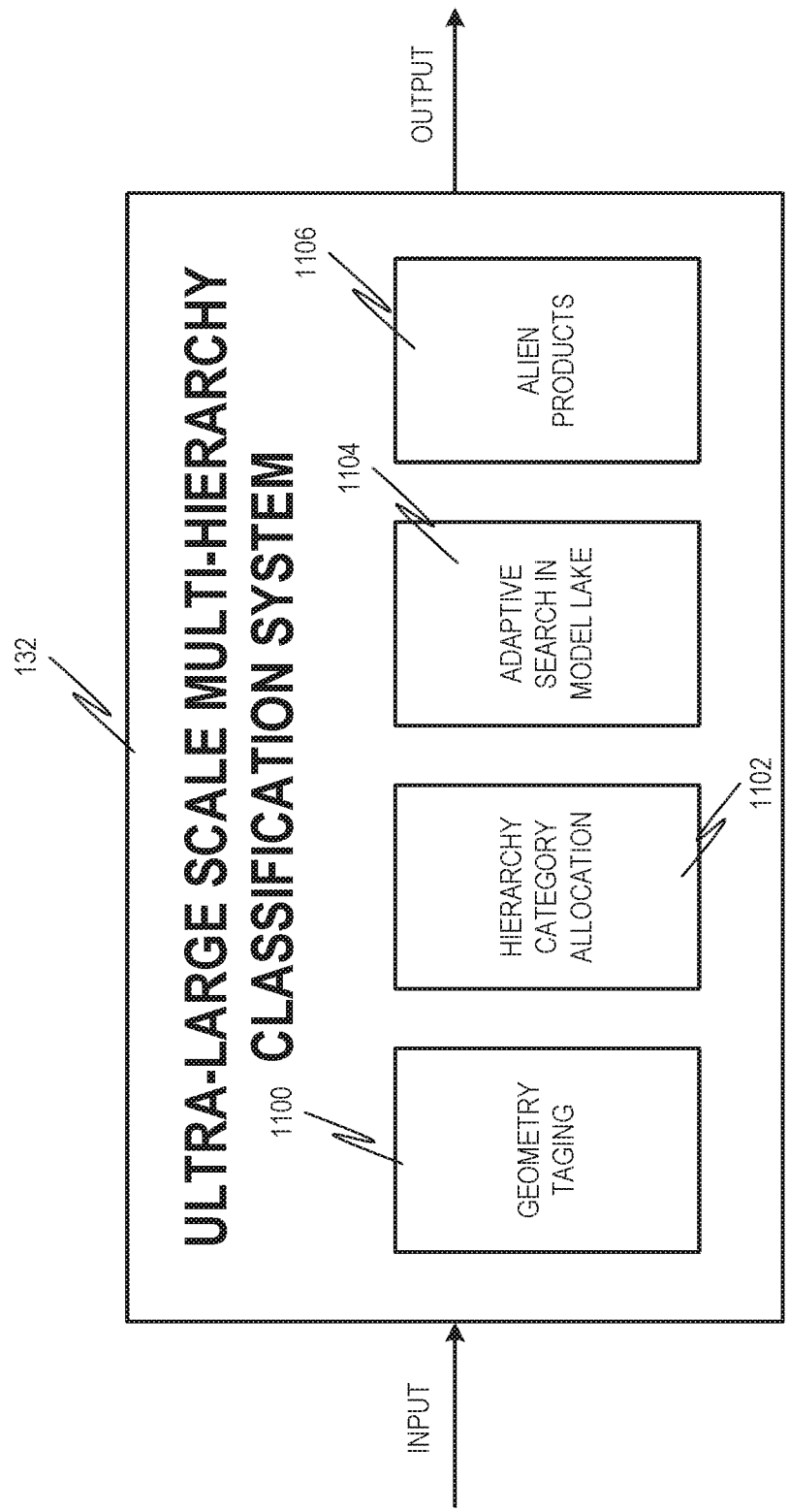
FIG. 11 is a block diagram illustrating an ultra-large scale multi-hierarchy classification system, in accordance with an example embodiment, in more detail.

FIG. 11 is a block diagram illustrating an ultra-large scale multi-hierarchy classification system 132, in accordance with an example embodiment, in more detail. A geometry tagging component 1100 acts to detect a metatag at the individual image level. This metatag may be used to downsize the total number of classification models which will be later used in the pipeline. The metatag may have been created using the output of the smart contour extractor 130.

A hierarchical category allocation component 1102 acts to take all the meta tags in the images detected in the geometry tagging component 1100 and allocate them to individual entities in the particular image. This allocation of metatags helps in pinpointing the classification model from the model lake.

An adaptive search in model lake component 1104 acts to enable dynamic search and invocation of classification models pertaining to individual images, based on geometry tags and hierarchical categories. For example, if the shape is identified as a glass bottle, then a glass bottle model may be fetched. If the shape is a can, then a can model can be fetched. Each of these models may be client-specific, such that a can model for one retailer, for example, can be different than a can model for another retailer.

An image could contain many different possible objects of many different shapes and sizes. It is infeasible to train a single monolith machine learned model to classify all of them reliably. Hence, in an example embodiment, a hierarchy of models is created. This hierarchy may contain any number of levels. At a minimum, for example, the tags are used to drill down into a huge hierarchical model imaging system to pinpoint the exact right model to identify the products in the image. Thus, for example, the tag may indicate a product having a particular shape and size (e.g., medium size can) and may then narrow the search for the correct model to only models that pertain to that particular shape and size. The following is example logic to retrieve a correct model using adaptive search:

```
adaptive_model_search(image_id, shape, client):
    if client equals 'xyz':
        if shape equals 'glass_bottle':
            fetch glass bottle model for xyz client
        else if shape equals 'cans':
            fetch cans model for xyz client
        //repeat the code blocks for other cases.
```

An alien product separation component 1106 acts to separate alien products for the specific usage context probabilistically and statistically. An alien product is one that appears similar to a product recognized by the particular model being used, but is not identical. For example, a can model specific to a particular cola brand would recognize cans of soda from the particular cola brand but not a competitor's can. The competitor's can would be an alien product in this context. This alien product separation process is used in business semantics for adherence checks of product placement and competitor product detection. Specifically, for example, the alien product separation component 1106 would recognize that an area of a display holding one brand of soda cans accidentally has one can from another brand mixed in with it.

Referring back to FIG. 1, the computer vision intelligence pipeline 126 further includes a smart depth-perception and product location clustering component 134. The smart depth-perception and product location clustering component 134 acts to identify the size and location of products which are kept in any arbitrary geometrical positions. This method is resilient to occlusion (when items are stacked one behind the other) and other atmospheric interferences like shine and refection.

The images from image capture devices 102A-102G contain spatial information about products, which are projected onto 2D space. The contours can be processed to accurately reclaim the 3D position of each product contained in the image. This helps in identification of the facing products as well as in clustering occluded products. In an example embodiment, the following pseudocode may be used for this process:

```
cluster_products(contours, calibration_matrix, image_width)
    points = [ ]
    for all contour in contours:
        if get_centroid(contour) < image_width/2:
            points.insert(get_leftmost_point(contour))
        else:
            points.insert(get_rightmost_point(contour))
    corrected_points       =       inverse(calibration_matrix).apply(points)
    column_clusters = cluster_points_on_x(corrected_points)
```

In an example embodiment, it may be recognized that two major distortions in these types of images are radial distortion and tangential distortion. In radial distortion, straight lines will appear curved. This effect is more apparent as it moves away from the center of the image. This distortion may be solved using the following formulas:

$x_{corrected} = x(1 + k_1 r^2 + k_2 r^4 + k_3 r^6)$ $y_{corrected} = y(1 + k_1 r^2 + k_2 r^4 + k_3 r^6)$ Similarly, tangential distortion occurs because the lens is not aligned perfectly parallel to the imaging plane, so some areas in the image may appear nearer than expected. This is solved using the following formulas:

$x_{corrected} = x + [2p_1 xy + p_2(r^2 + 2x^2)]$ $y_{corrected} = y + [p_1(r^2 + 2y^2) + 2p_2 xy]$ Thus, five parameters, known as distortion coefficients, need to be found:

Distortion coefficients = $(k_1 \; k_2 \; p_1 \; p_2 \; k_3)$

In addition, intrinsic and extrinsic parameters of a camera from which the image was taken need to be found. Intrinsic parameters are specific to the camera, such as focal length $(f_x, f_y)$| and optical centers $(c_x, c_y)$|. This may also be called the camera matrix, and can be expressed as a 3×3 matrix as follows:

$$\text{camera matrix} = \begin{bmatrix} f_x & 0 & c_x \\ 0 & f_y & c_y \\ 0 & 0 & 1 \end{bmatrix}$$

Extrinsic parameters correspond to rotation and translation vectors, which translate coordinates of a 3D point to a coordinate system.

For stereo applications, these distortions are corrected first. To find all of these parameters, some sample images of a well-defined pattern are provided. Some specific points may be found in the pattern. Its coordinates are known in real world space and known in images. With this information, mathematical formulas can be used to obtain distortion coefficients.

Figure 12:
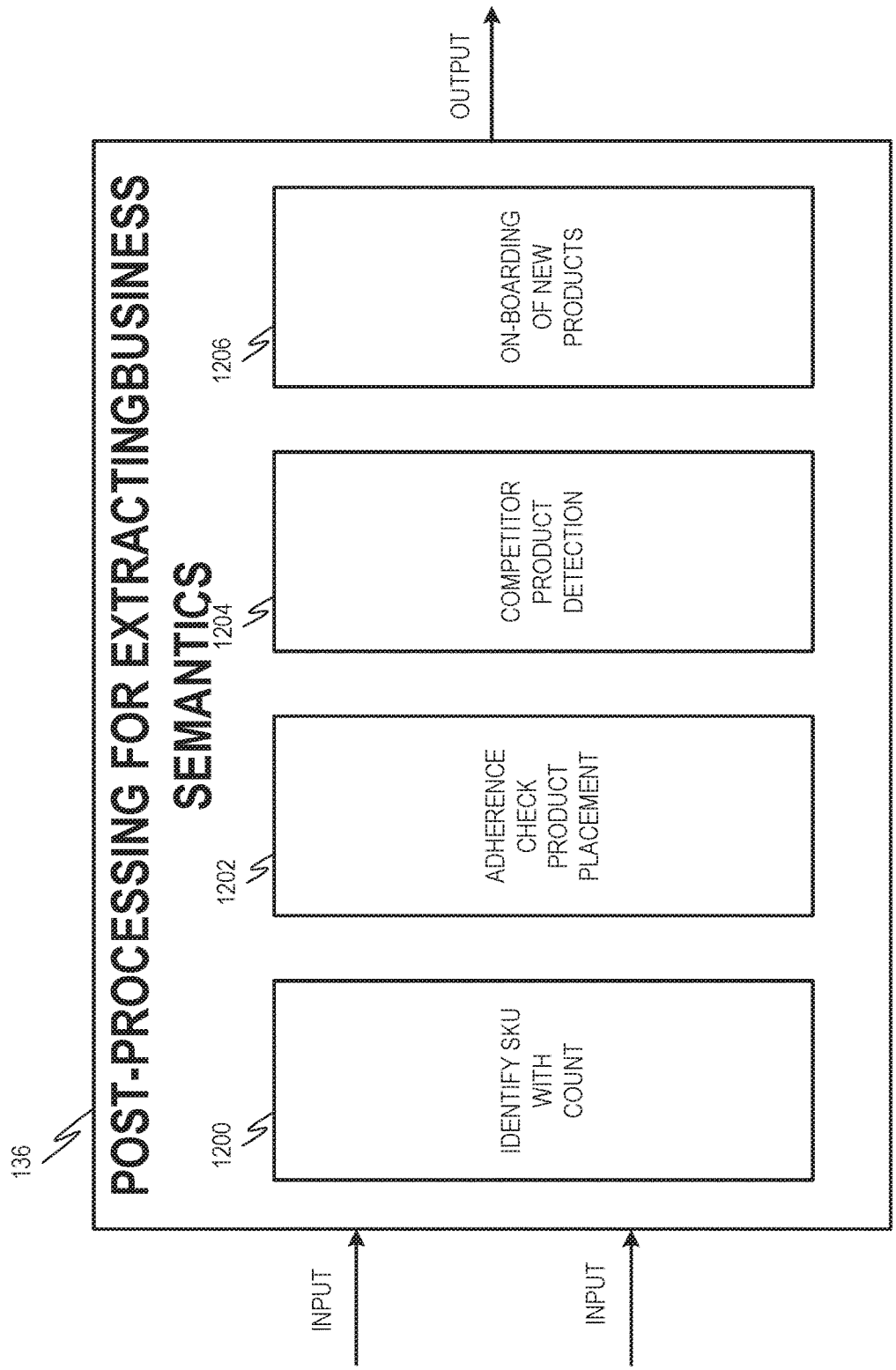
FIG. 12 is a block diagram illustrating a post-processing for extracting semantics component, in accordance with an example embodiment, in more detail.

Referring back to FIG. 1, the computer vision intelligence pipeline 126 further includes a post-processing for extracting semantics component 136. Here, many useful services can be provided. FIG. 12 is a block diagram illustrating a post-processing for extracting semantics component 136, in accordance with an example embodiment, in more detail. A count identification component 1200 may identify and count the exact number of products in the image. An adherence check component 1202 may perform an adherence check of product placement (e.g., determining if products are properly aligned and oriented). A competitor product detection component 1204 may detect a competitor product in the same column as a non-competitor product. A product onboarding component 1206 may aid in onboarding of new products. Since the product identification uses deep neural networks, training the system uses an optimal number of images. Using this process, customers can intelligently capture an optimum number of images and send them to the system for training.

Figure 13:
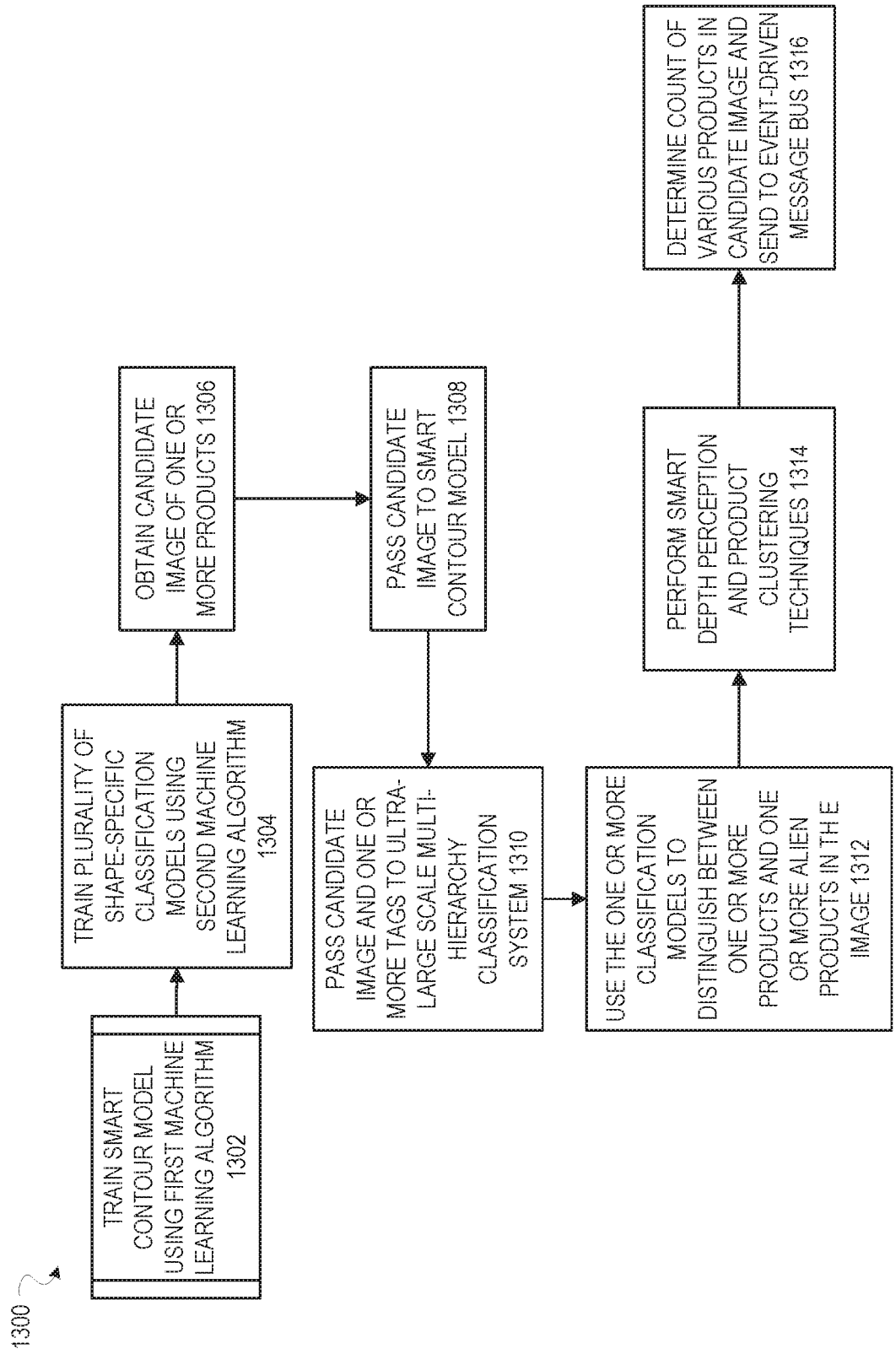
FIG. 13 is a flow diagram illustrating a method for using machine learning techniques to provide business insights about products in a plurality of images taken by at least one camera, in accordance with an example embodiment.

FIG. 13 is a flow diagram illustrating a method, 1300, for using machine learning techniques to provide business insights about products in a plurality of images taken by at least one camera, in accordance with an example embodiment. At operation 1302, a first machine learning algorithm is used to train a smart contour model to identify contours of product shapes in input images and to identify backgrounds in the input images.

The first machine learning algorithm will now be described in more detail. As described above, the first machine learning algorithm may train a DCNN. The DCNN is a machine-learning model that effectively infers non-linear relationships between a homogeneous input field and desired outputs, which are either categorical classes or scalars. The DCNN is a model that maps inputs to outputs using a sequence of so-called convolutional layers of artificial neurons.

Figure 14:
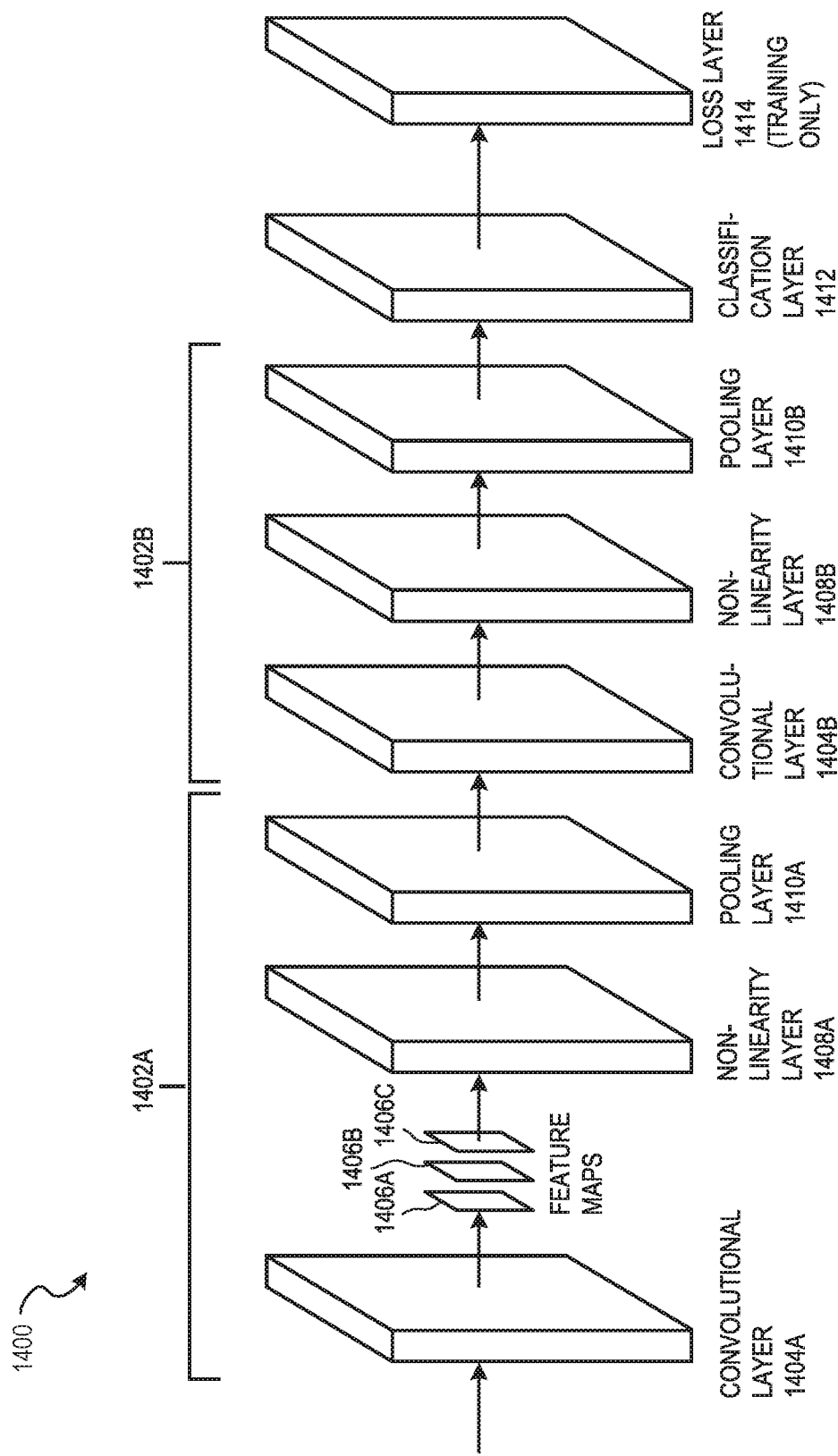
FIG. 14 is a diagram illustrating a Deep Convolutional Neural Network (DCNN), in accordance with an example embodiment.

FIG. 14 is a diagram illustrating a DCNN 1400, in accordance with an example embodiment. The DCNN 1400 is designed to learn not only tags for images, but to also learn the feature hierarchy, all the way from pixels to classifier, by defining a number of layers. The process of inference involves taking a given input, applying a sequence of mathematical functions called layers, and calculating the functions on the input images. Each layer extracts features from the output of a previous layer, and all layers are trained jointly. The layer-based architecture is why it is termed a "deep" convolutional neural network.

In an example embodiment, five different types of layers are utilized. The first four layers are the convolutional layer, the nonlinearity layer, the pooling layer, and the classification layer (although the classification is just a special case of convolution followed by "softmax"). These first four layers may be considered to be a stage, and the DCNN 1400 may actually be designed to have any number of these stages. Once the stages are all complete, a loss layer is used. Here, two stages 1402A, 1402B are depicted.

The convolutional layers 1404A, 1404B are the core of the DCNN 1400. Their parameters include a set of learnable filters that have a small receptive field, but extend through the full depth of the input image. In other words, for color images, each filter may look at a relatively small number of pixels in each image but look at all the colors in that area. During a forward pass in a convolutional layer 1404A, 1404B, each filter is convolved across the width and height of the input image, computing the dot product between the entries of the filter and the input and producing a 2D activation map of that filter. As a result, the DCNN 1400 learns filters that activate when they see some specific type of feature at some spatial position in the input image.

The feature maps for all filters can be stacked along the depth dimension to form the full volume output of the convolutional layers 1404A, 1404B.

The convolutional layers 1404A, 1404B apply mathematical operations called convolutional. For two spatial dimensions and an indeterminate amount of non-spatial dimensions (referred to as "channels"), the convolutional is defined using the * operator as follows:

$$y[n, m, d] = x * f = \sum_{o} \sum_{j=-M, k=-N}^{j=M, k=N} x[n, m, o] f_d[n-k, m-j, o]$$

The convolutional layers 1404A, 1404B will typically have some very small support, e.g., N=1 and M=1, such that g[n, m, d]=0 if |n|>1 or |m|>1.

It should be noted that the filters used in the convolutional layers 1404A, 1404B may be activated in a first iteration of the DCNN 1400 and refined prior to each additional iteration, based on actions taken in other layers in the previous iteration, until some error term is minimized below a particular threshold. In one example embodiment, this may be accomplished through back propagation, which is described in more detail below.

The output of the convolutional layers 1404A, 1404B are sets of arrays called feature maps 1406A-1406C. Each feature map 1406A-1406C may be produced by a different filter and modified based on various functions in each stage. For example, if the input is a color image, each feature map 1406A-1406C may be a 2D array of some aggregation of all color channel information. At the output, each feature map 1406A-1406C represents a particular feature extracted at all locations on the input and conditioned. The example in FIG. 14 is of a two-stage system, although one of ordinary skill in the art will recognize that more or fewer stages could be used while still being consistent with the present disclosure, and indeed as will be seen in an example embodiment, the number of stages may be dynamically determined at runtime to optimize results.

The nonlinearity layers 1408A, 1408B give the DCNN 1400 greater expressive power in uncovering nonlinear relationships between input and output. Many different nonlinearities could be used in the nonlinearity layer, including sigmoid, tan h, and rectified linear function. For brevity, one example of nonlinearity will be described here: the rectified linear function. This function is defined by the following:

$$y(x) = \begin{cases} x & \text{if } x > 0 \\ 0 & \text{if } x < 0 \end{cases}$$

The pooling layers 1410A, 1410B are applied to lower the input image's spatial dimensions while preserving some information from the input image. In other words, the pooling layers 1410A, 1410B do not actually do any of the learning; they are a fixed predefined operation that does not change as training progresses. Instead, they are used the spatial dimensions of the problem. In one example embodiment, a decimation approach could be followed, where one out of every N samples along a spatial dimension is kept out. In another example embodiment, some local statistics may be used for pooling, such as max pooling, defined as:

$$Y[n, m, d] = \max_{|n'|<N, |m'|<M} x[n+n', m+m', d]$$

where N=M=2.

When all of the stages 1402A, 1402B are complete, a classification layer 1412 is used to classify the image using the output of the final pooling layer 14110B. As stated above, the classification layer 1412 is actually a specialized convolutional layer containing a filter designed to produce the tags from the volume output of the final pooling layer 1410B. This filter applies a classification function having weights that may be refined in the same manner as the weights in the functions of the filters of the normal convolutional layers 1404, 1404B.

Back propagation involves calculating a gradient of a loss function (defined later) in a loss layer 1414, with respect to a number of weights in the DCNN 1400. The gradient is then fed to a method that updates the weights for the next iteration of the training of the DCNN 1400 in an attempt to minimize the loss function, which uses a different plurality of sample images (unless there is a need to repeat, such as running out of sample images). Back propagation uses the labeled sample images in a batch of sample images that have been passed through the stages 1402A, 1402B in order to calculate the loss function gradient for the samples as a group (although, as will be seen later, the loss function may be modified dynamically to eliminate some of the samples from consideration).

Back propagation may include two aspects: propagation and weight update. In the propagation aspect, forward propagation of a training pattern's input images is performed through the DCNN 1400 in order to generate the propagation's output activations (i.e., the images are passed through the stages 1402A, 1402B). Then, backward propagation of the propagation's output activations are performed through the DCNN 1400 using a target specified by the training pattern in order to generate the deltas of all output.

In the weight update aspect, for each weight of each filter, the output delta and input activation are multiplied to obtain the gradient of the weight, and then a ratio of the gradient is subtracted from the weight. The ratio influences speed and quality of learning. The higher the ratio, the faster the training, but at the expense of accuracy.

Thus, these two aspects, including both the forward pass and the backward pass through the stages 1402A, 1402B are performed repeatedly until the error rate is below a particular threshold. An example of back propagation algorithms compatible with the DCNN 1400 include, for example, gradient descent.

The use of the back propagation may be predicated on whether or not the combined error of the classification of the images in the batch of labeled sample images transgressed a preset error threshold. If the combined error is too great, then back propagation should occur to update and hopefully minimize the error for the next iteration, and a next iteration is performed with a subsequent batch of labeled sample images, until the combined error does not transgress the threshold.

Figure 15:
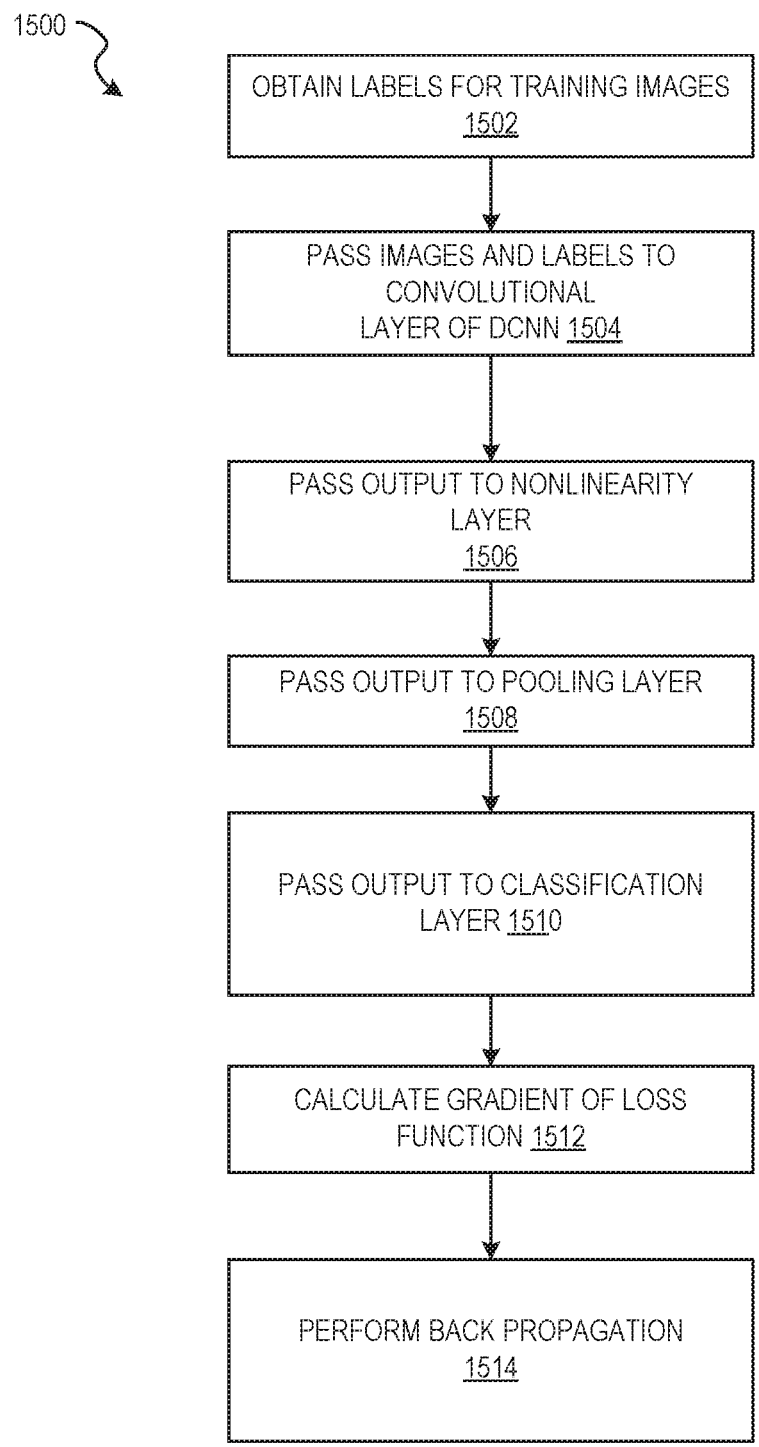
FIG. 15 is a flow diagram illustrating a method for training the smart contour model, in accordance with an example embodiment.

FIG. 15 is a flow diagram illustrating a method 1500 for training the smart contour model in accordance with an example embodiment.

A plurality of training images are obtained. Each of these training images may depict one or more products and a background. At operation 1502, labels for each of the training images may be obtained. Each of these labels may identify the contours of the one or more products in a corresponding training image and the background of the corresponding training image. At operation 1504, the plurality of training images and plurality of labels may be passed to a convolutional layer of a convolutional neural network, which outputs one or more feature maps. At operation 1506, the one or more feature maps may then be passed to a non-linearity layer, which generates output. At operation 1508, the output from the non-linearity layer may be passed to a pooling layer, which generates output. In some example embodiments, operations 1504-1508 may be repeated a number of times, based on the depth of the convolutional neural network. At operation 1510, output from the (final pass of the) pooling layer is passed to a classification layer, which outputs one or more tags for the image, the tags identifying the various shapes in the image and the background. At operation 1512, a loss layer calculates a gradient of a loss function. At operation 1514, back propagation occurs, which involves updating the weights for the next iteration of training in an attempt to minimize the loss function.

Referring back to FIG. 13, at operation 1304, a second machine learning algorithm is used to train a plurality of shape-specific classification models to output identifications of products in input images. In some example embodiments, the shape-specific models may be both shape and brand specific, in that each brand or manufacturer may have their own model for each shape of product. In some example embodiments, the second machine learning algorithm is the same as the first machine learning algorithm, such as a convolutional neural network, but in other example embodiments, the second machine learning algorithm may be different than the first machine learning algorithm. Operations 1302 and 1304 may be considered the training phase of the method 1300. At this point, the trained models may be utilized on actual candidate images.

At operation 1306, a candidate image of one or more products, taken a digital camera, may be obtained. At operation 1308, the candidate image is passed to the smart contour model, which outputs one or more tags identifying product contours in the candidate image. At operation 1310, the candidate image and the one or more tags are passed to an ultra-large scale multi-hierarchy classification system, which uses the one or more tags to identify one or more classification models for the individual product shape(s) in the image. At operation 1312, the one or more classification models are used to distinguish between one or more products and one or more alien products in the image.

At operation 1314, smart depth perception and product location clustering techniques are used to identify the size and location of products in the image, regardless of their geometrical positions. At operation 1316, a count of the various products in the candidate image is determined and this information is sent to an event-driven message bus for transmission to one or more subscribers.

In another example embodiment, a self-sustaining setup is used to acquire new data, learn distinguishing features from the data that can be used for solving business problems, and continuously adapt and adjust the acquired intelligence according to the changing experiences. Specifically, in this example embodiment, one or more of the smart edge clients 102A-102C of FIG. 1 contains or is coupled to a smart assistant for product on-boarding 138, which includes a visual wizard to capture a new product to be on-boarded, in various different visual orientations. This allows the product to be recognized from any visual orientation and with partial occlusion. A guided augmented overlay may suggest to the user to change the product orientation by certain dynamically computed degrees of rotation. This adaptive computation ensures that a high classification accuracy can be ensured with a minimum number of captured images. The coordination of the smart on-boarding features on the various smart edge clients 102A-102C may be preformed by a fully automated training and model management component 140 as depicted in FIG. 1.

In an example embodiment, the dynamically computed degrees of rotation are computed based on one or more of the following parameters: size and shape of the new product, dimensions of a base on which the new product sits (e.g., a rack), camera specifications, and a distance between the camera and the base on which the new product sits.

Additionally, generally available data augmentation techniques only support affine transformations like 2D/3D rotations, crop and brightness, exposure and contrast variations, and so forth. This can only simulate different physical conditions like darkness, brightness, low/high contrast, over-exposure and camera angle changes. Such existing approaches will not provide sufficient accuracy in real-world applications where the surroundings of the item have profound influence on its optical behavior. In an example embodiment, occlusion masks are chosen based on the camera position, field of view, and product shape. This ensures that a new product picture has enough occluded occurrence simulation without actually keeping it with other products. The angle of rotation is chosen based on the radius of the product (if a cylinder is fit onto it). This way, fewer angles are required (i.e., more degrees of separation between images) for a small product with lesser radius due to the fact that a few step rotations are enough to cover all information on the product. Hence, the number of different angles of rotations required is proportional to the volume of the product.

Images taken of a single product without any surrounding products lose out on reflection effects from adjacent products (e.g., reflection from an adjacent can). This causes accuracy issues in classification models. Hence, in an example embodiment, the effect is simulated using shape and similarity analysis of every possible pair and only considers those that differ the maximum (according to the chosen threshold). This way, very similar looking products get eliminated. The dissimilar looking pairs usually produce maximum reflection effects. As part of data augmentation, such noise distributions may be induced into the captured dataset to ensure that it is resilient to real-world situations and still provides high accuracy.

In another example embodiment, a meta-model learner 142 is used to optimally utilize the already learned feature sets from prior trained models to efficiently learn and deploy a new model. The meta-model learner 142 is based on a convolutional neural network with the weights already learned from, for example, the models produced by the first or second machine learning algorithms as described above. A 2D information flow structure represents context aware learning in the form of a knowledge graph that can classify millions of products. When a new product comes in, its resemblance to existing product groups is determined by custom statistical models that employ covariance and t-Distributed Stochastic Neighbor Embedding (t-sne). Based on this output, experimental (mutated) flow graphs are determined from the existing neural fabric by a meta learner. Simulated annealing mutation experiments are performed with the proposals from the meta-model learner 142.

The best resultant mutant is selected as a new model; a transfer learning approach is applied so that the new product delta learning happens simultaneously, ensuring that there is no catastrophic forgetting or redundancy in features learned. This model is then deployed to the model lake to track the new product.

In another example embodiment, a continuous self-learning system 144 is used. Specifically, a self-sustained setup is used when acquiring new data in order to learn distinguishing features, which can be used for solving business problems and provide the capability to continuously adapt and adjust the acquired intelligence according to the changing experiences. This helps identify new products.

Figure 16:
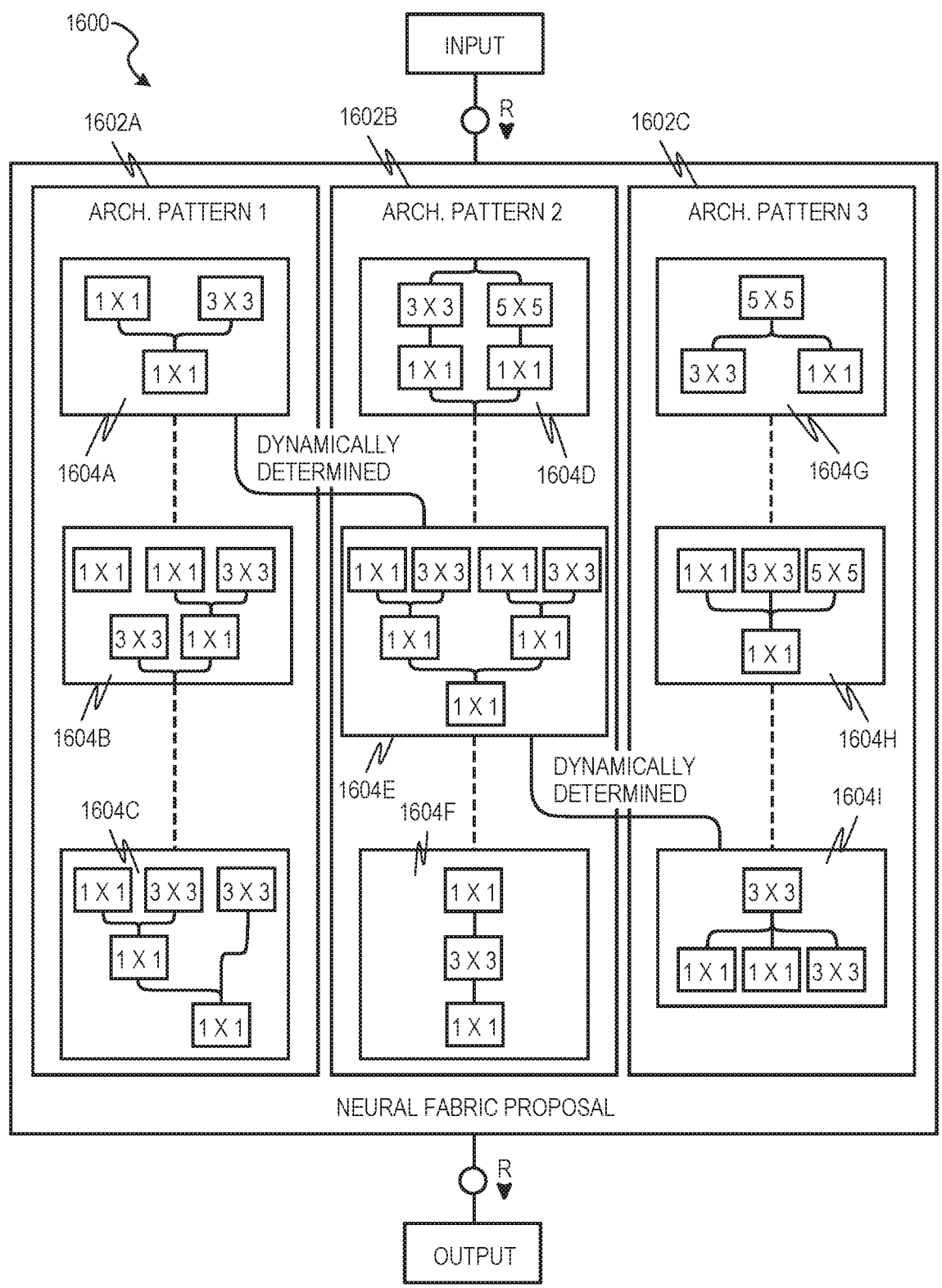
FIG. 16 is a block diagram illustrating a convolutional neural fabric, in accordance with an example embodiment.

In an example embodiment, a meta-learning architecture is provided that utilizes the already learned-feature sets to efficiently learn and deploy a new model. The meta-learning model may be based on a convolutional neural fabric with already learned weights. FIG. 16 is a convolutional neural fabric 1600, in accordance with an example embodiment. Each column represents a specific pattern 1602A, 1602B, 1602C of learned weights that can classify a specific set of products. While only three are depicted here, in many implementations, there may be hundreds of such architectural patterns in the model lake.

The patterns 1602A, 1602B, 1602C internally embody a series of convolutional filter clusters 1604A-1604I. Each convolutional filter cluster 1604A-1604I has certain combinations of convolutional filters (e.g., 1×1, 3×3 filters, etc.). These convolutional filter clusters 1604A-1604I learn low level features, which are hierarchically abstracted and lead to the final classification within an architectural pattern 1602A, 1602B, 1602C. These architectures are inherently linear in nature and the flow happens along such well-defined paths with each architectural pattern 1602A, 1602B, 1602C.

In an example embodiment, convolutional neural fabrics introduce lateral flows, which are dynamically determined. When a new set of products is received, resemblance to existing product groups is determined by a custom statistical model that employs covariance. A product similarity scoring is established. Then a SNE dimensionality reduction methodology is applied to determine how close features of the new products are with respect to existing product groups. All of the architectural models being used for this classification can then be used for neural fabric design.

Experimental flow graphs are determined from the existing neural fabric by a meta learner. Simulated annealing mutation experiments with the proposals from the meta learner may then be examined. The best resultant mutant is selected as a new model. A transfer learning approach may be used so that the new product delta learning happens simultaneously ensuring that there is no catastrophic forgetting or redundancy in features learned. The model is then deployed to the model lake to track the new item.

Figure 17:
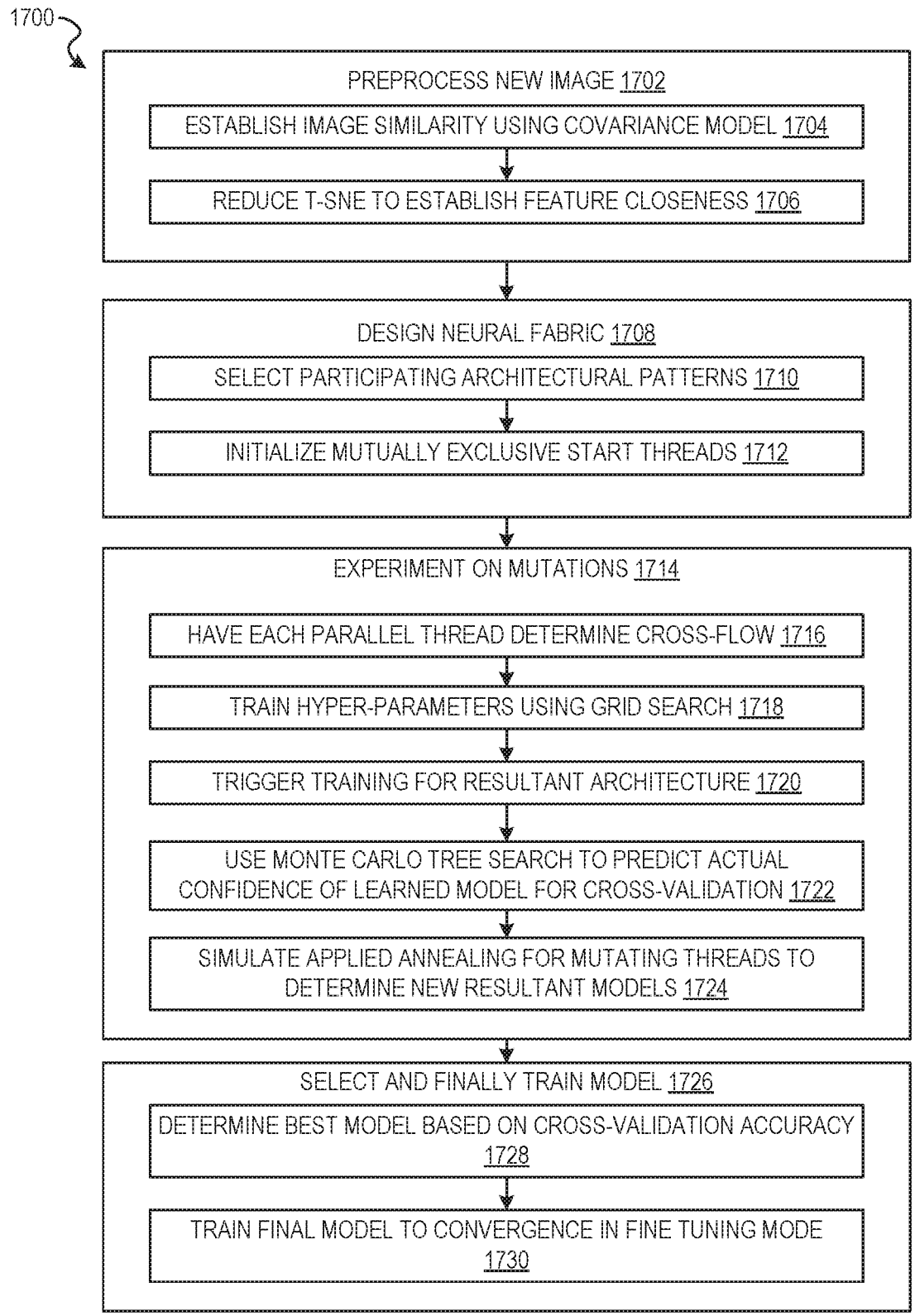
FIG. 17 is a flow diagram illustrating a meta learning process, in accordance with an example embodiment.

FIG. 17 is a flow diagram illustrating a meta learning process 1700, in accordance with an example embodiment. At operation 1702, a new image is preprocessed. This may include establishing image similarity using a covariance model at operation 1704 and reducing t-SNE in the image to establish feature closeness at operation 1706.

At operation 1708, the neural fabric may be designed. This may include selecting participating architectural patterns at operation 1710 and initializing mutually exclusive start threads at operation 1712.

At operation 1714, there may be experimentation on mutations. This may include a number of sub-operations. At operation 1716, each parallel thread determines cross-flow. At operation 1718, hyper-parameters are trained using grid search. At operation 1720, training for the resultant architecture may be triggered. At operation 1722, a Monte Carlo tree search may be used to predict actual confidence of learned model for cross-validation. At operation 1724, applied annealing for mutating threads may be simulated to determine new resultant models.

At operation 1726, the model may be selected and finally trained. This may include determining the best model based on cross-validation accuracy at operation 1728 and training the final model to convergence in a fine tuning mode at operation 1730.

Figure 18:
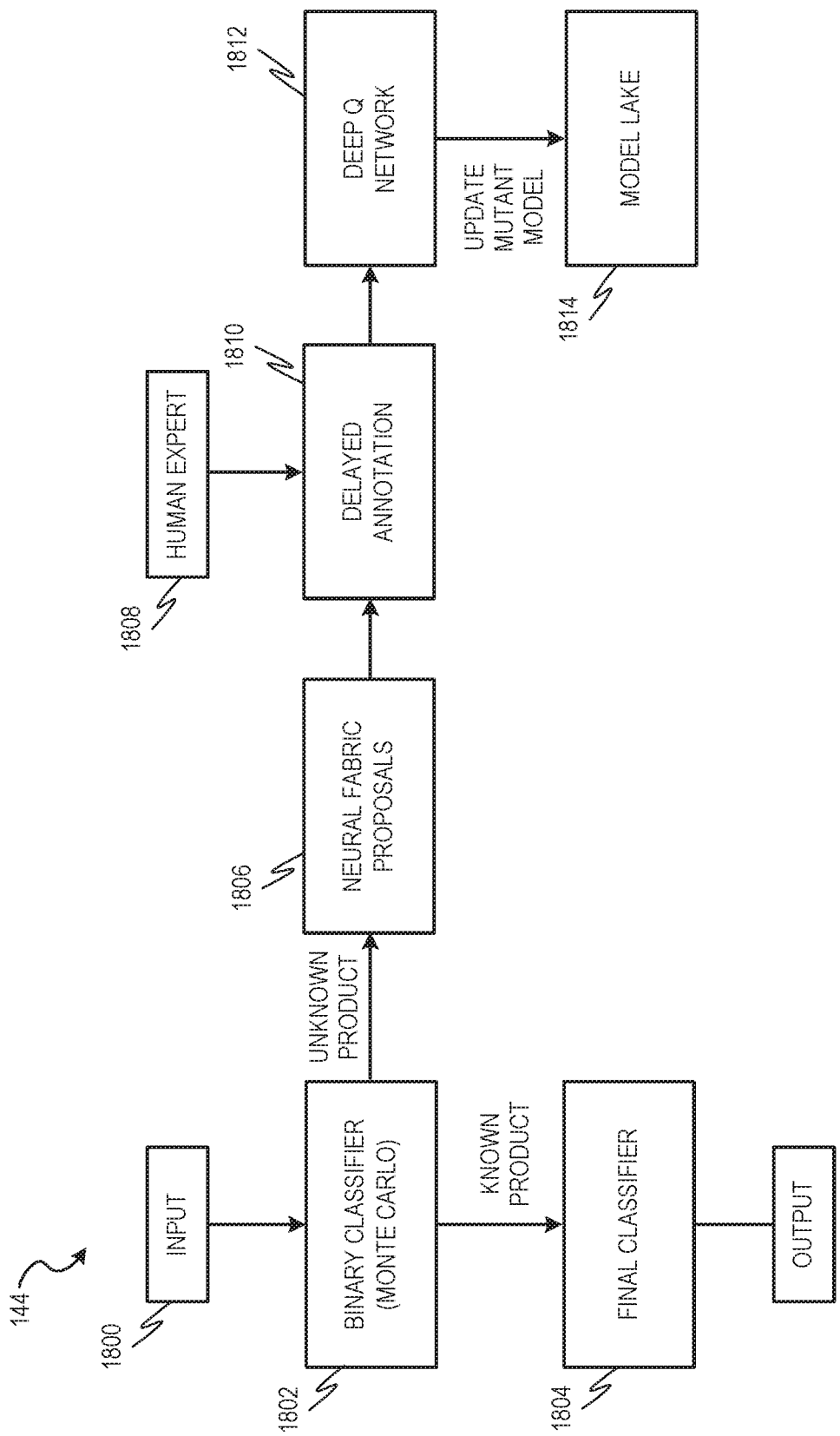
FIG. 18 is a block diagram illustrating a continuous self-learning system, in accordance with an example embodiment.

FIG. 18 is a block diagram illustrating a continuous self-learning system 144, in accordance with an example embodiment. An input image 1800 is passed to a binary classifier 1802, such as a Monte Carlo tree search-based binary classifier, that predicts with high accuracy whether the system understands a product image and classifies the image as "unknown" if the confidence level is below a preset threshold. In some example embodiments, this binary classifier 1802 may be part of or borrowed from the meta-model learner 142. If the binary classifier 1802 classifies the image as identifying a known product, then the image may simply be sent to the final classifier 1804. In some example embodiments, the final classifier 1804 is the smart contour extractor 130 and ultra-large scale multi-hierarchy classification system 132 of FIG. 1.

If the binary classifier 1802 classifies the image as identifying an unknown product, then the image is treated with one or more proposals 1806 from the neural network used in the meta-model learner 142 and results are collected. The result set is then presented to an expert 1808 for delayed annotation 1810, where the classification based on the one or more proposals 1806 may be accepted or otherwise commented on by the expert 1808.

The annotated proposals may then be used to train a deep Q network 1812, which acts to update the mutant model in the model lake 1814. A deep Q network is a combination of a deep neural network and reinforcement learning (a machine learning framework that prescribes how agents should act in an environment in order to maximize future cumulative reward).

EXAMPLES

Example 1

A system comprising:
at least one hardware processor; and
a computer-readable medium storing instructions that, when executed by the at least one hardware processor, cause the at least one hardware processor to perform operations comprising:
using a first machine learning algorithm to train a smart contour model to identify contours of product shapes in input images and to identify backgrounds in the input images;
using a second machine learning algorithm to train a plurality of shape-specific classification models to output identifications of products in input images;
obtaining a candidate image of one or more products;
passing the candidate image to the smart contour model, obtaining output of one or more tags identifying product contours in the candidate image;
passing the candidate image and the one or more tags to an ultra-large scale multi-hierarchy classification system to identify one or more classification models for one or more individual product shapes in the candidate image; and
using the one or more classification models to distinguish between one or more products in the image and one or more unknown products in the image.

Example 2

The system of example 1, wherein the first machine learning algorithm is a deep convolutional neural network.

Example 3

The system of examples 1 or 2, wherein the operations further comprise:
using smart depth perception and product location clustering techniques to identify the size and location of products in the image, regardless of their geometrical positions, based on the one or more tags; and
determining a count of various products in the candidate image using results of the using of the smart depth perception and product location clustering techniques.

Example 4

The system of example 3, wherein the operations further comprise:
sending the count to an event-driven message bus for transmission to one or more subscribers.

Example 5

The system of examples 2 or 3, wherein the deep convolutional neural network has at least one convolutional layer, at least one non-linearity layer, at least one pooling layer, and at least one classification layer.

Example 6

The system of example 5, wherein the deep convolutional neural network further has a loss layer.

Example 7

The system of any of examples 1-6, wherein the using a first machine learning algorithm includes using a plurality of training images tagged with contours of products in the training images, wherein the tagged contours are stored in separate files from the training images.

Example 8

A method comprising:
using a first machine learning algorithm to train a smart contour model to identify contours of product shapes in input images and to identify backgrounds in the input images;
using a second machine learning algorithm to train a plurality of shape-specific classification models to output identifications of products in input images;
obtaining a candidate image of one or more products;
passing the candidate image to the smart contour model, obtaining output of one or more tags identifying product contours in the candidate image;
passing the candidate image and the one or more tags to an ultra-large scale multi-hierarchy classification system to identify one or more classification models for one or more individual product shapes in the candidate image; and
using the one or more classification models to distinguish between one or more products in the image and one or more unknown products in the image.

Example 9

The method of example 8, wherein the first machine learning algorithm is a deep convolutional neural network.

Example 10

The method of examples 8 or 9, wherein the operations further comprise:
using smart depth perception and product location clustering techniques to identify the size and location of products in the image, regardless of their geometrical positions, based on the one or more tags; and
determining a count of various products in the candidate image using results of the using of the smart depth perception and product location clustering techniques.

Example 11

The method of example 10, wherein the operations further comprise:
sending the count to an event-driven message bus for transmission to one or more subscribers.

Example 12

The examples of any of examples 9-11, wherein the deep convolutional neural network has at least one convolutional layer, at least one non-linearity layer, at least one pooling layer, and at least one classification layer.

Example 13

The method of example 12, wherein the deep convolutional neural network further has a loss layer.

Example 14

A non-transitory machine-readable storage medium comprising instructions, which when implemented by one or more machines, cause the one or more machines to perform operations comprising:
using a first machine learning algorithm to train a smart contour model to identify contours of product shapes in input images and to identify backgrounds in the input images;
using a second machine learning algorithm to train a plurality of shape-specific classification models to output identifications of products in input images;
obtaining a candidate image of one or more products;
passing the candidate image to the smart contour model, obtaining output of one or more tags identifying product contours in the candidate image;
passing the candidate image and the one or more tags to an ultra-large scale multi-hierarchy classification system to identify one or more classification models for one or more individual product shapes in the candidate image; and
using the one or more classification models to distinguish between one or more products in the image and one or more unknown products in the image.

Example 15

The non-transitory machine-readable storage medium of example 14, wherein the first machine learning algorithm is a deep convolutional neural network.

Example 16

The non-transitory machine-readable storage medium of examples 14 or 15, wherein the operations further comprise:
using smart depth perception and product location clustering techniques to identify the size and location of products in the image, regardless of their geometrical positions, based on the one or more tags; and
determining a count of various products in the candidate image using results of the using of the smart depth perception and product location clustering techniques.

Example 17

The non-transitory machine-readable storage medium of example 16, wherein the operations further comprise:

sending the count to an event-driven message bus for transmission to one or more subscribers.

Example 18

The non-transitory machine-readable storage medium of any of examples 15-17, wherein the deep convolutional neural network has at least one convolutional layer, at least one non-linearity layer, at least one pooling layer, and at least one classification layer.

Example 19

The non-transitory machine-readable storage medium of example 18, wherein the deep convolutional neural network further has a loss layer.

Example 20

The non-transitory machine-readable storage medium of any of examples 14-19, wherein the using a first machine learning algorithm includes using a plurality of training images tagged with contours of products in the training images, wherein the tagged contours are stored in separate files from the training images.

Figure 19:
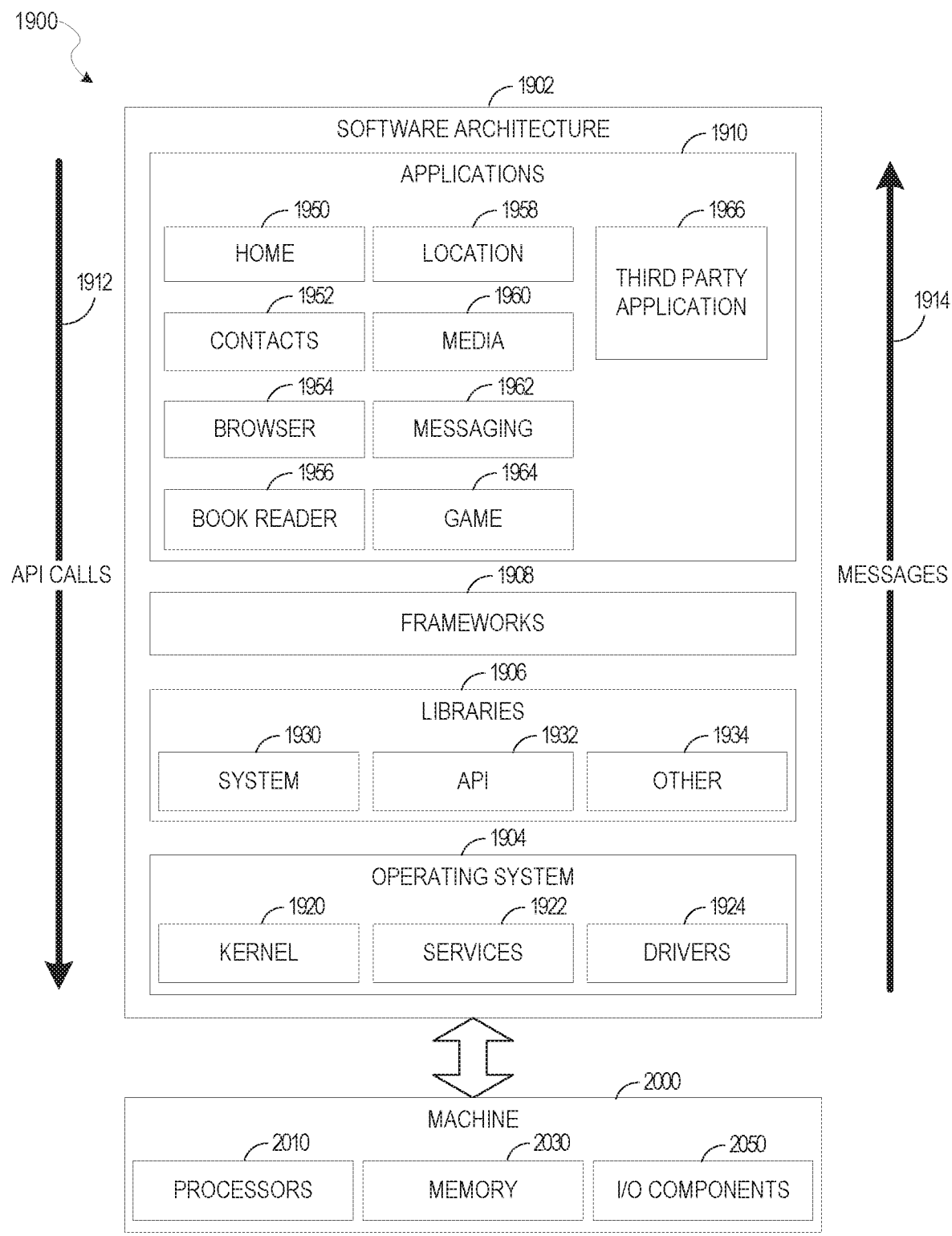
FIG. 19 is a block diagram illustrating an architecture of software, which can be installed on any one or more of the devices described above.

FIG. 19 is a block diagram 1900 illustrating an architecture of software 1902, which can be installed on any one or more of the devices described above. FIG. 19 is merely a non-limiting example of a software architecture, and it will be appreciated that many other architectures can be implemented to facilitate the functionality described herein. In various embodiments, the software 1902 is implemented by hardware such as a machine 2000 of FIG. 20 that includes processors 2010, memory 2030, and input/output (I/O) components 2050. In this example architecture, the software 1902 can be conceptualized as a stack of layers where each layer may provide a particular functionality. For example, the software 1902 includes layers such as an operating system 1904, libraries 1906, frameworks 1908, and applications 1910. Operationally, the applications 1910 invoke API calls 1912 through the software stack and receive messages 1914 in response to the API calls 1912, consistent with some embodiments.

In various implementations, the operating system 1904 manages hardware resources and provides common services. The operating system 1904 includes, for example, a kernel 1920, services 1922, and drivers 1924. The kernel 1920 acts as an abstraction layer between the hardware and the other software layers, consistent with some embodiments. For example, the kernel 1920 provides memory management, processor management (e.g., scheduling), component management, networking, and security settings, among other functionality. The services 1922 can provide other common services for the other software layers. The drivers 1924 are responsible for controlling or interfacing with the underlying hardware, according to some embodiments. For instance, the drivers 1924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1906 provide a low-level common infrastructure utilized by the applications 1910. The libraries 1906 can include system libraries 1930 (e.g., C standard library) that can provide functions such as memory allocation functions, string manipulation functions, mathematic functions, and the like. In addition, the libraries 1906 can include API libraries 1932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1906 can also include a wide variety of other libraries 1934 to provide many other APIs to the applications 1910.

The frameworks 1908 provide a high-level common infrastructure that can be utilized by the applications 1910, according to some embodiments. For example, the frameworks 1908 provide various graphic user interface (GUI) functions, high-level resource management, high-level location services, and so forth. The frameworks 1908 can provide a broad spectrum of other APIs that can be utilized by the applications 1910, some of which may be specific to a particular operating system or platform.

In an example embodiment, the applications 1910 include a home application 1950, a contacts application 1952, a browser application 1954, a book reader application 1956, a location application 1958, a media application 1960, a messaging application 1962, a game application 1964, and a broad assortment of other applications such as a third-party application 1966. According to some embodiments, the applications 1910 are programs that execute functions defined in the programs. Various programming languages can be employed to create one or more of the applications 1910, structured in a variety of manners, such as object-oriented programming languages (e.g., Objective-C, Java, or C++) or procedural programming languages (e.g., C or assembly language). In a specific example, the third-party application 1966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1966 can invoke the API calls 1912 provided by the operating system 1904 to facilitate functionality described herein.

Figure 20:
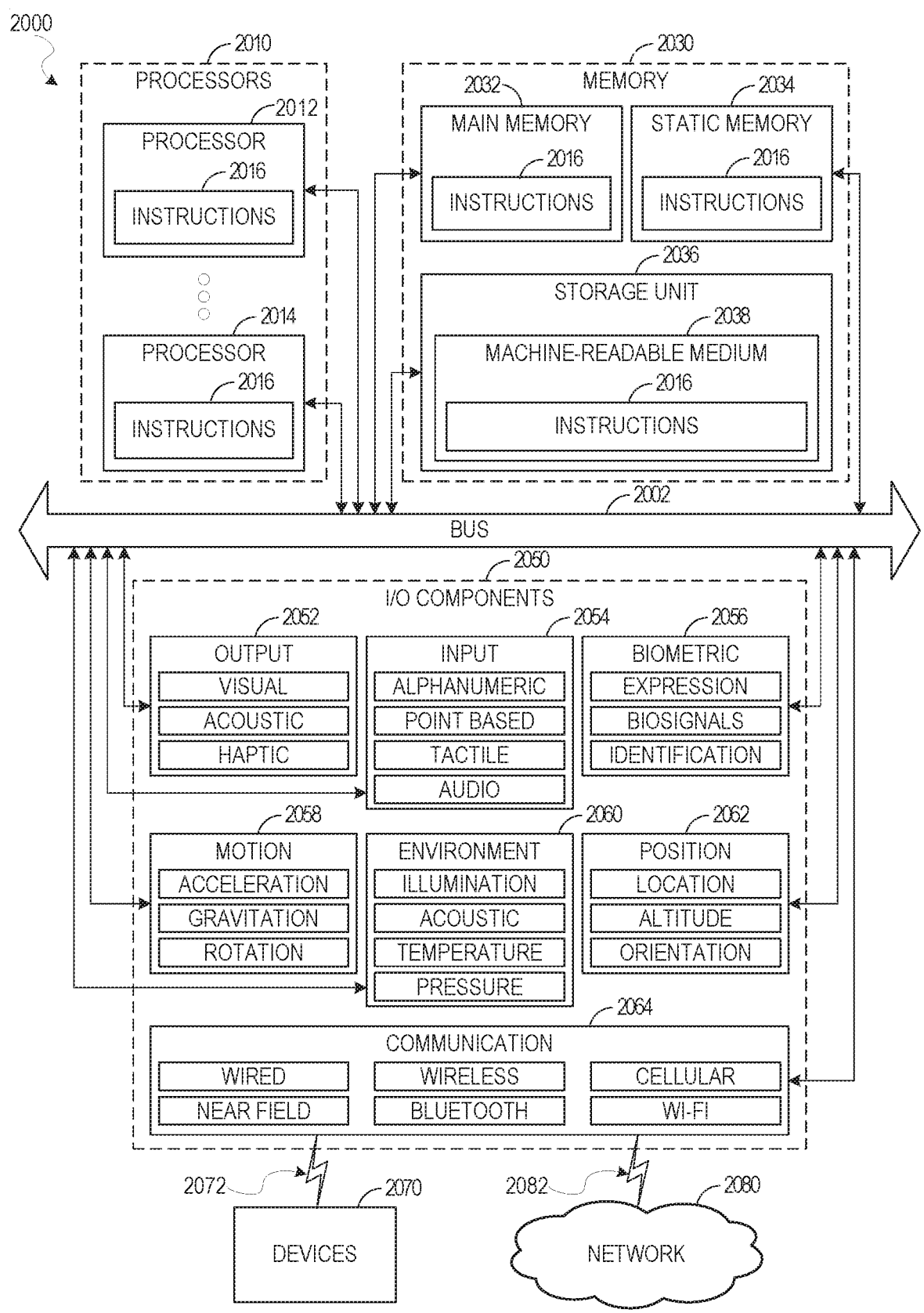
FIG. 20 illustrates a diagrammatic representation of a machine in the form of a computer system within which a set of instructions may be executed for causing the machine to perform any one or more of the methodologies discussed herein, according to an example embodiment.

FIG. 20 illustrates a diagrammatic representation of a machine 2000 in the form of a computer system within which a set of instructions may be executed for causing the machine to perform any one or more of the methodologies discussed herein, according to an example embodiment. Specifically, FIG. 20 shows a diagrammatic representation of the machine 2000 in the example form of a computer system, within which instructions 2016 (e.g., software, a program, an application, an applet, an app, or other executable code) for causing the machine 2000 to perform any one or more of the methodologies discussed herein may be executed. For example, the instructions 2016 may cause the machine 2000 to execute the method 800 of FIG. 8. Additionally, or alternatively, the instructions 2016 may implement FIGS. 1-18, and so forth. The instructions 2016 transform the general, non-programmed machine 2000 into a particular machine 2000 programmed to carry out the described and illustrated functions in the manner described. In alternative embodiments, the machine 2000 operates as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance other smart devices, a web appliance, a network router, a network switch, a network bridge, or any machine capable of executing the instructions 2016, sequentially or otherwise, that specify actions to be taken by the machine 2000. Further, while only a single machine 2000 is illustrated, the term "machine" shall also be taken to include a collection of machines 2000 that individually or jointly execute the instructions 2016 to perform any one or more of the methodologies discussed herein.

The machine 2000 may include processors 2010, memory 2030, and I/O components 2050, which may be configured to communicate with each other such as via a bus 2002. In an example embodiment, the processors 2010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 2012 and a processor 2014 that may execute the instructions 2016. The term "processor" is intended to include multi-core processors that may comprise two or more independent processors (sometimes referred to as "cores") that may execute instructions contemporaneously. Although FIG. 20 shows multiple processors 2010, the machine 2000 may include a single processor with a single core, a single processor with multiple cores (e.g., a multi-core processor), multiple processors with a single core, multiple processors with multiples cores, or any combination thereof.

The memory 2030 may include a main memory 2032, a static memory 2034, and a storage unit 2036, both accessible to the processors 2010 such as via the bus 2002. The main memory 2032, the static memory 2034, and the storage unit 2036 store the instructions 2016 embodying any one or more of the methodologies or functions described herein. The instructions 2016 may also reside, completely or partially, within the main memory 2032, within the static memory 2034, within the storage unit 2036, within at least one of the processors 2010 (e.g., within the processor's cache memory), or any suitable combination thereof, during execution thereof by the machine 2000.

The I/O components 2050 may include a wide variety of components to receive input, provide output, produce output, transmit information, exchange information, capture measurements, and so on. The specific I/O components 2050 that are included in a particular machine will depend on the type of machine. For example, portable machines such as mobile phones will likely include a touch input device or other such input mechanisms, while a headless server machine will likely not include such a touch input device. It will be appreciated that the I/O components 2050 may include many other components that are not shown in FIG. 20. The I/O components 2050 are grouped according to functionality merely for simplifying the following discussion, and the grouping is in no way limiting. In various example embodiments, the I/O components 2050 may include output components 2052 and input components 2054. The output components 2052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2050 may include biometric components 2056, motion components 2058, environmental components 2060, or position components 2062, among a wide array of other components. For example, the biometric components 2056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2058 may include acceleration sensor components (e.g., accelerometer), gravitation sensor components, rotation sensor components (e.g., gyroscope), and so forth. The environmental components 2060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2050 may include communication components 2064 operable to couple the machine 2000 to a network 2080 or devices 2070 via a coupling 2082 and a coupling 2072, respectively. For example, the communication components 2064 may include a network interface component or another suitable device to interface with the network 2080. In further examples, the communication components 2064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2070 may be another machine or any of a wide variety of peripheral devices (e.g., a peripheral device coupled via a. USB).

Moreover, the communication components 2064 may detect identifiers or include components operable to detect identifiers. For example, the communication components 2064 may include RFID tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2064, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 2030, 2032, 2034, and/or memory of the processor(s) 2010) and/or the storage unit 2036 may store one or more sets of instructions and data structures (e.g., software) embodying or utilized by any one or more of the methodologies or functions described herein. These instructions (e.g., the instructions 2016), when executed by the processor(s) 2010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 2080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2080 or a portion of the network 2080 may include a wireless or cellular network, and the coupling 2082 may be a Code Division Multiple Access (CDMA) connection, a Global System for Mobile communications (GSM) connection, or another type of cellular or wireless coupling. In this example, the coupling 2082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 2016 may be transmitted or received over the network 2080 using a transmission medium via a network interface device (e.g., a network interface component included in the communication components 2064) and utilizing any one of a number of well-known transfer protocols (e.g., HTTP). Similarly, the instructions 2016 may be transmitted or received using a transmission medium via the coupling 2072 (e.g., a peer-to-peer coupling) to the devices 2070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2016 for execution by the machine 2000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   using a first machine learning algorithm to train a contour model to identify contours of product shapes in input images and to identify backgrounds in the input images;
   using a second machine learning algorithm to train a plurality of shape-specific classification models to output identifications of products in input images;
   obtaining a candidate image of one or more products;
   passing the candidate image to the contour model, obtaining output of one or more tags identifying product contours in the candidate image;
   passing the candidate image and the one or more tags to a multi-hierarchy classification system to identify at least one shape corresponding to the one or more products in the candidate image;

retrieving a classification model uniquely corresponding to one of the identified shapes; and using the classification model uniquely corresponding to the one of the identified shapes to distinguish between one or more products in the image and one or more unknown products in the image.

2. The system of claim 1, wherein the first machine learning algorithm is a deep convolutional neural network.

3. The system of claim 1, wherein the operations further comprise:

using depth perception and product location clustering techniques to identify the size and location of products in the image, regardless of their geometrical positions, based on the one or more tags; and determining a count of various products in the candidate image using results of the using of the depth perception and product location clustering techniques.

4. The system of claim 3, wherein the operations further comprising:

sending the count to an event-driven message bus for transmission to one or more subscribers.

5. The system of claim 2, wherein the deep convolutional neural network has at least one convolutional layer, at least one non-linearity layer, at least one pooling layer, and at least one classification layer.

6. The system of claim 5, wherein the deep convolutional neural network further has a loss layer.

7. The system of claim 1, wherein the using of the first machine learning algorithm includes using a plurality of training images tagged with contours of products in the training images, wherein the tagged contours are stored in separate files from the training images.

8. A method comprising:

using a first machine learning algorithm to train a contour model to identify contours of product shapes in input images and to identify backgrounds in the input images;

using a second machine learning algorithm to train a plurality of shape-specific classification models to output identifications of products in input images;

obtaining a candidate image of one or more products;

passing the candidate image to the contour model, obtaining output of one or more tags identifying product contours in the candidate image;

passing the candidate image and the one or more tags to a multi-hierarchy classification system to identify at least one shape corresponding to the one or more products in the candidate image;

retrieving a classification model uniquely corresponding to one of the identified shapes; and using the classification model uniquely corresponding to the one of the identified shapes to distinguish between one or more products in the image and one or more unknown products in the image.

9. The method of claim 8, wherein the first machine learning algorithm is a deep convolutional neural network.

10. The method of claim 8, wherein the operations further comprise:

using depth perception and product location clustering techniques to identify the size and location of products in the image, regardless of their geometrical positions, based on the one or more tags; and determining a count of various products in the candidate image using results of the using of the depth perception and product location clustering techniques.

11. The method of claim 10, wherein the operations further comprising:

sending the count to an event-driven message bus for transmission to one or more subscribers.

12. The method of claim 9, wherein the deep convolutional neural network has at least one convolutional layer, at least one non-linearity layer, at least one pooling layer, and at least one classification layer.

13. The method of claim 12, wherein the deep convolutional neural network further has a loss layer.

14. A non-transitory machine-readable storage medium comprising instructions that, when implemented by one or more machines, cause the one or more machines to perform operations comprising:

using a first machine learning algorithm to train a contour model to identify contours of product shapes in input images and to identify backgrounds in the input images;

using a second machine learning algorithm to train a plurality of shape-specific classification models to output identifications of products in input images;

obtaining a candidate image of one or more products;

passing the candidate image to the contour model, obtaining output of one or more tags identifying product contours in the candidate image;

passing the candidate image and the one or more tags to a multi-hierarchy classification system to identify at least one shape corresponding to the one or more products in the candidate image;

retrieving a classification model uniquely corresponding to one of the identified shapes; and using the classification model uniquely corresponding to the one of the identified shapes to distinguish between one or more products in the image and one or more unknown products in the image.

15. The non-transitory machine-readable storage medium of claim 14, wherein the first machine learning algorithm is a deep convolutional neural network.

16. The non-transitory machine-readable storage medium of claim 14, wherein the operations further comprise:

using depth perception and product location clustering techniques to identify the size and location of products in the image, regardless of their geometrical positions, based on the one or more tags; and determining a count of various products in the candidate image using results of the using of the depth perception and product location clustering techniques.

17. The non-transit machine-readable storage medium of claim 16, wherein the operations further comprising:

sending the count to an event-driven message bus for transmission to one or more subscribers.

18. The non-transitory machine-readable storage medium of claim 15, wherein the deep convolutional neural network has at least one convolutional layer, at least one non-linearity layer, at least one pooling layer, and at least one classification layer.

19. The non-transitory machine-readable storage medium of claim 18, wherein the deep convolutional neural network further has a loss layer.

20. The non-transitory machine-readable storage medium of claim 14, wherein the using a first machine learning algorithm includes using a plurality of training images tagged with contours of products in the training images, wherein the tagged contours are stored in separate files from the training images.

* * * * *